(12) United States Patent
Guo et al.

(10) Patent No.: US 11,748,889 B2
(45) Date of Patent: Sep. 5, 2023

(54) BRAIN IMAGE SEGMENTATION METHOD AND APPARATUS, NETWORK DEVICE, AND STORAGE MEDIUM

(71) Applicant: TENCENT TECHNOLOGY (SHENZHEN) COMPANY LIMITED, Shenzhen (CN)

(72) Inventors: Heng Guo, Shenzhen (CN); Yuexiang Li, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 277 days.

(21) Appl. No.: 17/241,800

(22) Filed: Apr. 27, 2021

(65) Prior Publication Data

US 2021/0248751 A1 Aug. 12, 2021

Related U.S. Application Data

(63) Continuation of application No. PCT/CN2020/072114, filed on Jan. 15, 2020.

(30) Foreign Application Priority Data

Jan. 25, 2019 (CN) .......................... 201910070881.7

(51) Int. Cl.
*G06T 7/00* (2017.01)
*G06T 7/11* (2017.01)
(Continued)

(52) U.S. Cl.
CPC .............. *G06T 7/11* (2017.01); *G06F 18/213* (2023.01); *G06F 18/25* (2023.01); *G06V 10/26* (2022.01);
(Continued)

(58) Field of Classification Search
CPC ............. G06T 7/11; G06T 2207/10088; G06T 2207/20081; G06T 2207/20084;
(Continued)

(56) References Cited

U.S. PATENT DOCUMENTS

2010/0322488 A1* 12/2010 Virtue ...................... G06T 7/11
382/128
2012/0099779 A1* 4/2012 Gupta ...................... G06T 7/11
382/133

(Continued)

FOREIGN PATENT DOCUMENTS

CN 105701799 A 6/2016
CN 107909588 A 4/2018
(Continued)

OTHER PUBLICATIONS

Vidyaratne et al., "Deep learning and texture-based semantic label fusion for brain tumor segmentation", Progress in Biomedical Optics and Imaging, SPIE—International Society for Optical Engineering, Bellingham, WAS, US, vol. 10575, Feb. 27, 2018, pp. 105750D-105750D. (Year: 2018).*

(Continued)

*Primary Examiner* — Van D Huynh
(74) *Attorney, Agent, or Firm* — Crowell & Moring LLP

(57) ABSTRACT

Embodiments of this application disclose a brain image segmentation method and apparatus, a network device, and a storage medium. The method includes obtaining, by a device, a to-be-segmented image group comprising a plurality of modal images of a brain. The device includes a memory storing instructions and a processor in communication with the memory. The method further includes performing, by the device, skull stripping according to the plurality of modal images to obtain a skull-stripped mask; separately performing, by the device, feature extraction on the plurality of modal images to obtain extracted features, (Continued)

and fusing the extracted features to obtain a fused feature; segmenting, by the device, encephalic tissues according to the fused feature to obtain an initial segmentation result; and fusing, by the device, the skull-stripped mask and the initial segmentation result to obtain a segmentation result corresponding to the to-be-segmented image group.

17 Claims, 14 Drawing Sheets

(51) Int. Cl.
    *G06F 18/25*     (2023.01)
    *G06F 18/213*     (2023.01)
    *G06V 10/764*     (2022.01)
    *G06V 10/80*     (2022.01)
    *G06V 10/82*     (2022.01)
    *G06V 10/44*     (2022.01)
    *G06V 10/26*     (2022.01)

(52) U.S. Cl.
    CPC .......... *G06V 10/454* (2022.01); *G06V 10/764* (2022.01); *G06V 10/80* (2022.01); *G06V 10/82* (2022.01); *G06T 2207/10088* (2013.01); *G06T 2207/20081* (2013.01); *G06T 2207/20084* (2013.01); *G06T 2207/30016* (2013.01)

(58) Field of Classification Search
    CPC ......... G06T 2207/30016; G06T 7/0012; G06T 2207/30096; G06F 18/213; G06F 18/25; G06V 10/26; G06V 10/454; G06V 10/764; G06V 10/80; G06V 10/82; G06V 2201/03; G06N 3/04; G06N 3/08
    USPC ........................................................ 382/173
    See application file for complete search history.

(56) References Cited

U.S. PATENT DOCUMENTS

| | | | | |
|---|---|---|---|---|
| 2015/0279084 A1* | 10/2015 | Deuerling-Zheng | ..... | G06T 5/50 345/424 |
| 2016/0055644 A1* | 2/2016 | Betting | ................. | G06T 7/0012 382/131 |
| 2016/0292847 A1* | 10/2016 | Liu | ........................... | G06T 7/10 |
| 2016/0328855 A1 | 10/2016 | Lay et al. | | |
| 2018/0025489 A1 | 1/2018 | Tiwari et al. | | |
| 2020/0380687 A1* | 12/2020 | Avital | ................. | G01R 33/5608 |
| 2022/0012892 A1* | 1/2022 | Avital | ................. | A61B 5/0042 |

FOREIGN PATENT DOCUMENTS

| | | |
|---|---|---|
| CN | 108257134 A | 7/2018 |
| CN | 108876794 A | 11/2018 |
| CN | 108986106 A | 12/2018 |
| CN | 109872328 A | 6/2019 |

OTHER PUBLICATIONS

Chinese Office Action with concise translation regarding 201910070881.7 dated Dec. 24, 2020, 13 pgs.
International Search Report with concise translation and written opinion regarding PCT/CN2020/072114 dated Apr. 21, 2020, 9 pgs.
Vidyaratne et al., "Deep Learning and Texture-Based Semantic Label Fusion in Brain Tumor Segmentation," SPIE Medical Imaging, Feb. 27, 2018, 10 pgs.
Kleesiek et al., "Deep MRI brain extraction: A 3Dconvolutional neural network for skull stripping," NeuroImage 129, MDMI Lab , Div. of Neuroradiology, Heidelberg University Hospital, Heidelberg, Germany, Jan. 22, 2016, 10 pgs.
Roy et al., :Multiple Sclerosis Lesion Segmentation from Brain MRI via Fully Convolutional Neural Networks, Center for Neuroscience and Regenerative Medicine, Department of Neurology, Johns Hopkins University, U.S., Mar. 24, 2018, 14 pgs.
Extended European Search Report regarding EP 20 74 4359 dated Feb. 10, 2022.
Vidyaratne Let al, "Deep learning and texture-based semantic label fusion for brain tumor segmentation," Progress in Biomedical Optics and Imaging, SPIE—International Society for Optical Engineering, Bellingham, WA, US, vol. 10575, Feb. 27, 2018, pp. 105750D-105750D.
Pereira Sergio et al, "Brain Tumor Segmentation Using Convolutional Neural Networks in MRI Images," IEEE Transactions on Medical Imaging, IEEE, USA, vol. 35, no. 5, May 1, 2016, pp. 1240-1251, [retrieved on Apr. 29, 2016].
Li Yuexiang et al, "Deep Learning Based Multimodal Brain Tumor Diagnosis," Feb. 17, 2018, Advances in Biometrics : International Conference, ICB 2007, Seoul, Korea, Aug. 27-29, 2007; Proceedings; [Lecture Notes in Computer Science; Lect.Notes Computer], Springer, Berlin, Heidelberg, pp. 149-158, [retrieved on Feb. 17, 2018].

* cited by examiner

T1 image    T1_IR image    T2 image

BRAIN IMAGE SEGMENTATION METHOD AND APPARATUS, NETWORK DEVICE, AND STORAGE MEDIUM

RELATED APPLICATION

This application is a continuation application of PCT Patent Application No. PCT/CN2020/072114, filed on Jan. 15, 2020, which claims priority to Chinese Patent Application No. 201910070881.7, filed with the National Intellectual Property Administration, PRC on Jan. 25, 2019, both of which are incorporated herein by reference in their entireties.

FIELD OF THE TECHNOLOGY

This application relates to the field of communication technologies, and specifically, to a medical image segmentation method and apparatus, a network device, and a storage medium. The medical image may include, for example, but not limited to, a brain image.

BACKGROUND OF THE DISCLOSURE

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer science, which attempts to understand essence of intelligence and produces a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level and software-level technologies. Basic AI technologies generally include technologies such as sensor, dedicated AI chip, cloud computing, distributed storage, a big data processing technology, operation/interaction system, and mechatronics. AI software technologies mainly include several major directions such as a computer vision technology, a speech processing technology, a natural language processing technology, and machine learning (ML)/deep learning.

ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

Brain diseases are one of main diseases threatening health of human bodies, and quantitative analysis of a brain tissue structure is of great significance to clinical medicine. Brain degradation diseases such as Alzheimer's disease, Parkinson's disease, multiple sclerosis, and schizophrenia are used as an example. Because these neurologic diseases change normal volumes and regional distributions of soft tissues and cerebrospinal fluid in a human brain, a doctor may perform accurate measurement on volumes of the tissues to evaluate a risk and a disease level of a patient. As a premise of accurate measurement, accurate segmentation of a brain image is particularly important.

Conventional brain image segmentation is generally implemented manually, and with development of the computer vision technology and the AI technology, a technology of segmenting magnetic resonance imaging (MRI) of a brain based on deep learning is further proposed currently. Specifically, for example, after a plurality of modal images of brain tissues are fused, skull stripping is performed (that is, to separate the brain tissues from non-brain tissues) by using software, and then tissue region identification and segmentation are performed on a stripping result. Although compared with a conventional solution, the solution has higher efficiency and segmentation accuracy, information from some modalities is discarded during fusion. Consequently, feature expression capabilities are very limited, which greatly affecting the segmentation accuracy.

SUMMARY

Embodiments of this application provide a medical image segmentation method and apparatus, a network device, and a storage medium, which can improve feature expression capabilities and segmentation accuracy. The medical image may include, for example, but not limited to, a brain image.

An embodiment of the present disclosure provides a method for segmenting medical images. The method includes obtaining, by a device, a to-be-segmented image group comprising a plurality of modal images of a brain. The device includes a memory storing instructions and a processor in communication with the memory. The method further includes performing, by the device, skull stripping according to the plurality of modal images to obtain a skull-stripped mask; separately performing, by the device, feature extraction on the plurality of modal images to obtain extracted features, and fusing the extracted features to obtain a fused feature; segmenting, by the device, encephalic tissues according to the fused feature to obtain an initial segmentation result; and fusing, by the device, the skull-stripped mask and the initial segmentation result to obtain a segmentation result corresponding to the to-be-segmented image group.

Another embodiment of the present disclosure provides an apparatus for segmenting medical images. The apparatus includes a memory storing instructions; and a processor in communication with the memory. When the processor executes the instructions, the processor is configured to cause the apparatus to perform: obtaining a to-be-segmented image group comprising a plurality of modal images of a brain, performing skull stripping according to the plurality of modal images to obtain a skull-stripped mask, separately performing feature extraction on the plurality of modal images to obtain extracted features, and fusing the extracted features to obtain a fused feature, segmenting encephalic tissues according to the fused feature to obtain an initial segmentation result, and fusing the skull-stripped mask and the initial segmentation result to obtain a segmentation result corresponding to the to-be-segmented image group.

Another embodiment of the present disclosure provides a non-transitory computer readable storage medium, storing computer readable instructions. The computer readable instructions, when executed by a processor in a first electronic device, are configured to cause the processor to perform: obtaining a to-be-segmented image group comprising a plurality of modal images of a brain; performing skull stripping according to the plurality of modal images to obtain a skull-stripped mask; separately performing feature extraction on the plurality of modal images to obtain extracted features, and fusing the extracted features to obtain a fused feature; segmenting encephalic tissues according to the fused feature to obtain an initial segmentation result; and fusing the skull-stripped mask and the initial segmentation result to obtain a segmentation result corresponding to the to-be-segmented image group.

Another embodiment of this application provides a brain image segmentation method, performed by a network device, the method including:

obtaining a to-be-segmented image group, the to-be-segmented image group including a plurality of modal images of a brain;

performing skull stripping according to the plurality of modal images, to obtain a skull-stripped mask;

separately performing feature extraction on the plurality of modal images, and fusing extracted features;

segmenting encephalic tissues according to a fused feature, to obtain an initial segmentation result; and fusing the mask and the initial segmentation result, to obtain a segmentation result corresponding to the to-be-segmented image group.

Correspondingly, an embodiment of this application provides a brain image segmentation apparatus, including an obtaining unit, a stripping unit, an extraction unit, a segmentation unit, and a fusion unit, which are as follows:

an obtaining unit, configured to obtain a to-be-segmented image group, the to-be-segmented image group including a plurality of modal images of a brain;

a stripping unit, configured to perform skull stripping according to the plurality of modal images, to obtain a skull-stripped mask;

an extraction unit, configured to separately perform feature extraction on the plurality of modal images, and fuse extracted features;

a segmentation unit, configured to segment encephalic tissues according to a fused feature, to obtain an initial segmentation result; and a fusion unit, configured to fuse the mask and the initial segmentation result, to obtain a segmentation result corresponding to the to-be-segmented image group.

An embodiment of this application further provides a storage medium, storing a plurality of instructions, the instructions being suitable for being loaded by a processor, to perform the foregoing brain image segmentation method.

Correspondingly, an embodiment of this application further provides a network device, including a processor and a memory, the memory being configured to store a plurality of instructions, the instructions, when executed on the processor, causing the processor to perform the foregoing brain image segmentation method.

In the embodiments of this application, after a to-be-segmented image group is obtained, on one hand, skull stripping may be performed according to a plurality of modal images in the to-be-segmented image group, to obtain a skull-stripped mask; on the other hand, feature extraction may be separately performed on the plurality of modal images and extracted features are fused, then encephalic tissues are segmented according to a fused feature, and subsequently an initial segmentation result obtained through segmentation and the previously obtained mask are fused, to obtain a final segmentation result. In this solution, during initial segmentation, a manner of first extracting the features of the modal images and then fusing the extracted features is used. Therefore, information contained in modalities can be retained as much as possible, thereby improving expression capabilities of the extracted features. In addition, the mask obtained through skull stripping may further be used to remove a false positive phenomenon in the segmentation result obtained through the initial segmentation. Therefore, compared with a solution in which the modal images are directly fused and skull stripping is directly performed, and then segmentation is performed based on a result of the stripping, this solution can improve feature expression capabilities and segmentation accuracy.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

Various embodiments of this application provide a medical image segmentation method and apparatus, and a storage medium. The medical image segmentation apparatus may be integrated into a network device. The network device may be a server device, a terminal, or another device. The medical image may include brain image or other tissue image Taking brain images as an example, various embodiments provide a brain image segmentation method and apparatus, and a storage medium. The brain image segmentation apparatus may be integrated into a network device. The network device may be a server device, a terminal, or another device.

Figure 1:
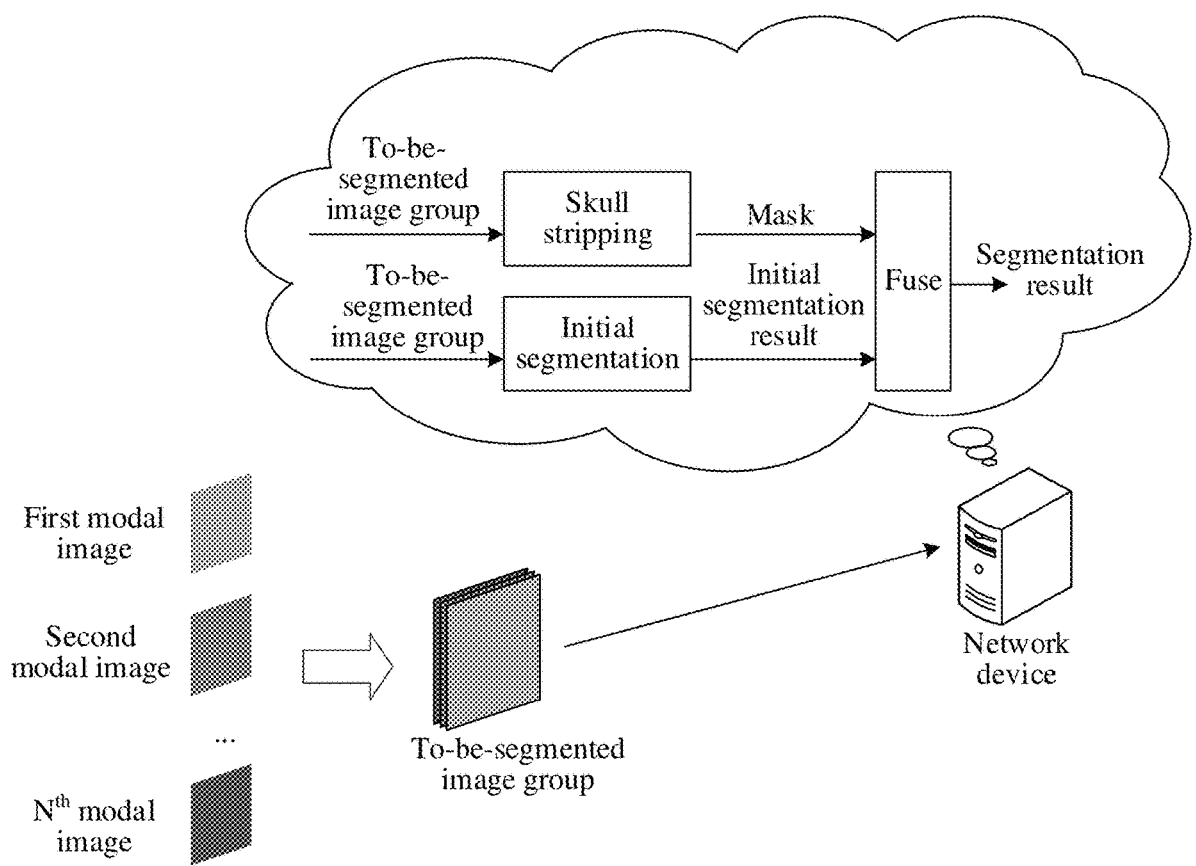
FIG. 1 is a schematic diagram of a scenario of a brain image segmentation method according to an embodiment of this application.

For example, referring to FIG. 1, the brain image segmentation apparatus is specifically integrated into a network device. First, images of a plurality of modalities of the brain of the same person may be acquired by using medical image acquisition devices such as a computed tomography (CT) or a magnetic resonance imaging device. Then the acquired plurality of modal images (such as a first modal image, a second modal image, . . . , and an $N^{th}$ modal image) are added to the same set, to obtain a to-be-segmented image group, and the to-be-segmented image group is provided to a network device. After receiving the to-be-segmented image group, on one hand, the network device may perform skull stripping according to the plurality of modal images, to obtain a skull-stripped mask; and on the other hand, the network device may segment encephalic tissues according to the plurality of modal images, to obtain an initial segmentation result, and subsequently fuse the mask and the initial segmentation result, to obtain a segmentation result corresponding to the to-be-segmented image group.

During initial segmentation, to avoid impact of an image information loss on feature expression capabilities, feature extraction is performed, but the plurality of modal images are not fused in this solution. Instead, after feature extraction is separately performed on the plurality of modal images, extracted features are fused. Subsequently, the encephalic tissues are segmented according to a fused feature, to obtain the initial segmentation result. The solution can improve feature expression capabilities, and fusion of the mask and the initial segmentation result can remove a false positive phenomenon in the initial segmentation result, thereby greatly improving segmentation accuracy.

Detailed descriptions are separately provided below. The description sequence of the following embodiments is not intended to limit orders of the embodiments.

In this embodiment, descriptions are provided from the perspective of a brain image segmentation apparatus. The brain image segmentation apparatus may be specifically integrated into a network device such as a terminal or a server device.

A brain image segmentation method is provided, performed by a brain image segmentation apparatus, the method including: obtaining a to-be-segmented image group, the to-be-segmented image group including a plurality of modal images of a brain; performing skull stripping according to the plurality of modal images, to obtain a skull-stripped mask; separately performing feature extraction on the plurality of modal images, and fusing extracted features; segmenting encephalic tissues according to a fused feature, to obtain an initial segmentation result; and fusing the mask and the initial segmentation result, to obtain a segmentation result corresponding to the to-be-segmented image group. As described above, the brain image segmentation apparatus is integrated into a network device, so that the brain image segmentation method may be performed by the network device. In one implementation, one step of performing skull stripping according to the plurality of modal images, to obtain a skull-stripped mask and another step of separately performing feature extraction on the plurality of modal images, and fusing extracted features may be performed in any arbitrary order, for example, one step is before another step or one step is after another step.

Figure 2:
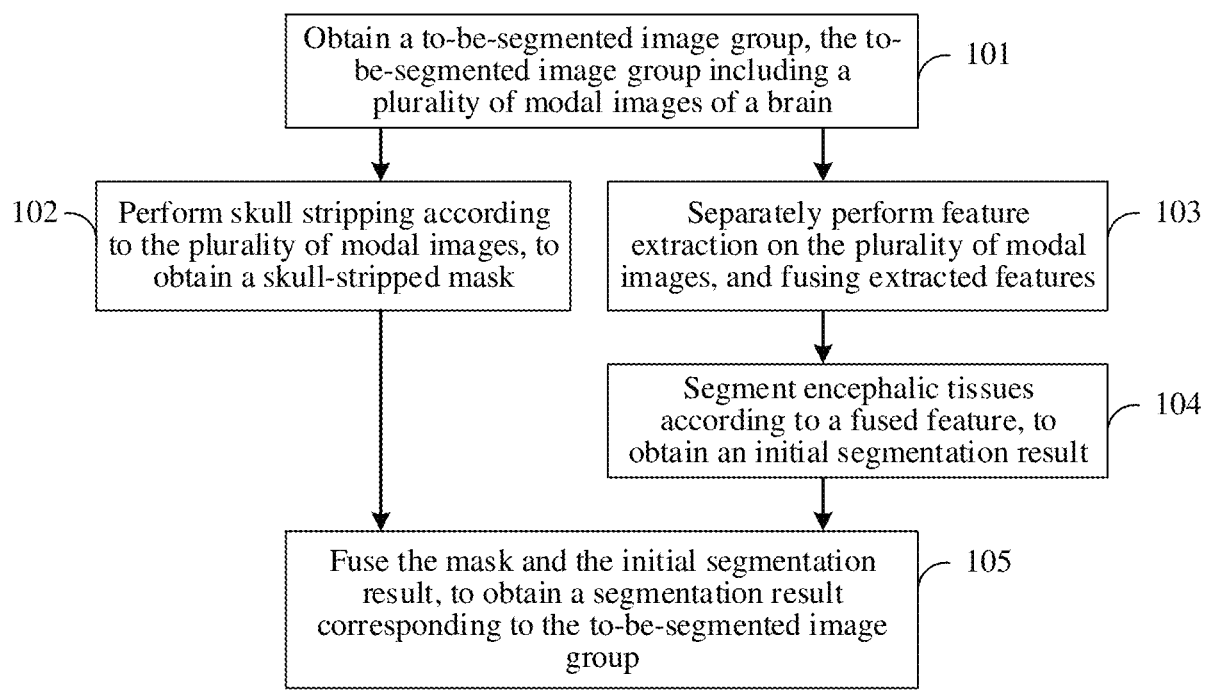
FIG. 2 is a flowchart of a brain image segmentation method according to an embodiment of this application.

As shown in FIG. 2, a specific procedure of the brain image segmentation apparatus may be as follows:

101: Obtain a to-be-segmented image group.

For example, specifically, a to-be-segmented image group sent by medical image acquisition devices such as a CT or a magnetic resonance imaging device may be received. Each to-be-segmented image group may be acquired by medical image acquisition devices for the brain of the same object such as the same person.

The to-be-segmented image group is a set of images on which image segmentation needs to be performed, which may specifically include a plurality of modal images of the brain, for example, a first modal image (such as a T1 image in magnetic resonance modal images) used for tissue region segmentation, a second modal image (such as a T1 inversion recovery (T1_IR) image in magnetic resonance modal images) used for encephalic region identification, and a third modal image (such as a T2 image in magnetic resonance modal images) used for protein lesion region identification.

The T1 image is a data modality in magnetic resonance imaging, is an image obtained by merely capturing longitudinal movement of hydrogen protons during magnetic resonance imaging, and is mainly used for observing anatomical details. The T1_IR image is a fat suppression technique in magnetic resonance imaging, which highlights other tissues by suppressing signal strength of a fatty tissue, and is very useful for observing adrenal glands, bone marrow, and fatty tumours. The T2 image mainly refers to a fluid attenuation inversion recovery (FLAIR) in this embodiment of this application, is a technology for suppressing signal strength of water in magnetic resonance imaging, and is very useful for displaying cerebral oedema and periventricular or cortical lesions generated under multiple sclerosis.

102: Perform skull stripping according to the plurality of modal images, to obtain a skull-stripped mask.

Skull stripping is an operation of stripping a skull from magnetic resonance imaging of a brain, that is, an operation of identifying encephalic regions in an image, and classifying the encephalic regions and background regions (that is, regions other than the encephalic regions) (that is, separating brain tissues from non-brain tissues). The mask is an image obtained after the encephalic regions are retained, and voxel points in the background regions are blocked.

During skull stripping, all the modal images or some of the modal images may be used. For example, the plurality of modal images include a first modal image, a second modal image, and a third modal image, and in this case, skull stripping may be performed according to the first modal image and the second modal image, to obtain a skull-stripped mask. A manner of skull stripping may be specifically as follows:

(1) Fuse the first modal image and the second modal image, to obtain a fused image.

There may be a plurality of specific fusion manners. For example, the first modal image and the second modal image may be fused through feature addition or channel splicing, to obtain a fused image.

(2) Predict categories of voxel points in the fused image by using a trained three-dimensional fully convolutional network.

The trained three-dimensional fully convolutional network is a branch of trained brain image segmentation model provided in this embodiment of this application. The trained three-dimensional fully convolutional network may include two parts: one part is a three-dimensional residual network (which may alternatively be referred to as an encoder) used for encoding, to perform feature extraction on the fused image; the other part is a classification network (which may alternatively be referred to as a decoder) mainly used for decoding, to predict categories of voxel points.

If the trained three-dimensional fully convolutional network includes a three-dimensional residual network and a classification network, the step of predicting categories of voxel points in the fused image by using a trained three-dimensional fully convolutional network may include a portion or all of the following steps.

Step A: Perform feature extraction on the fused image by using the three-dimensional residual network, to obtain feature information.

A specific structure of the three-dimensional residual network may be determined according to requirements for an actual application. For example, the three-dimensional residual network may include a convolutional layer, a plurality of residual blocks, a plurality of downsampling modules, and the like. Residual blocks of different sizes (that is, sizes of inputted/outputted images) can implement feature extraction of different scales, and a downsampling module can generate a thumbnail of a corresponding image, so that an outputted image can meet a required image size.

Figure 3:
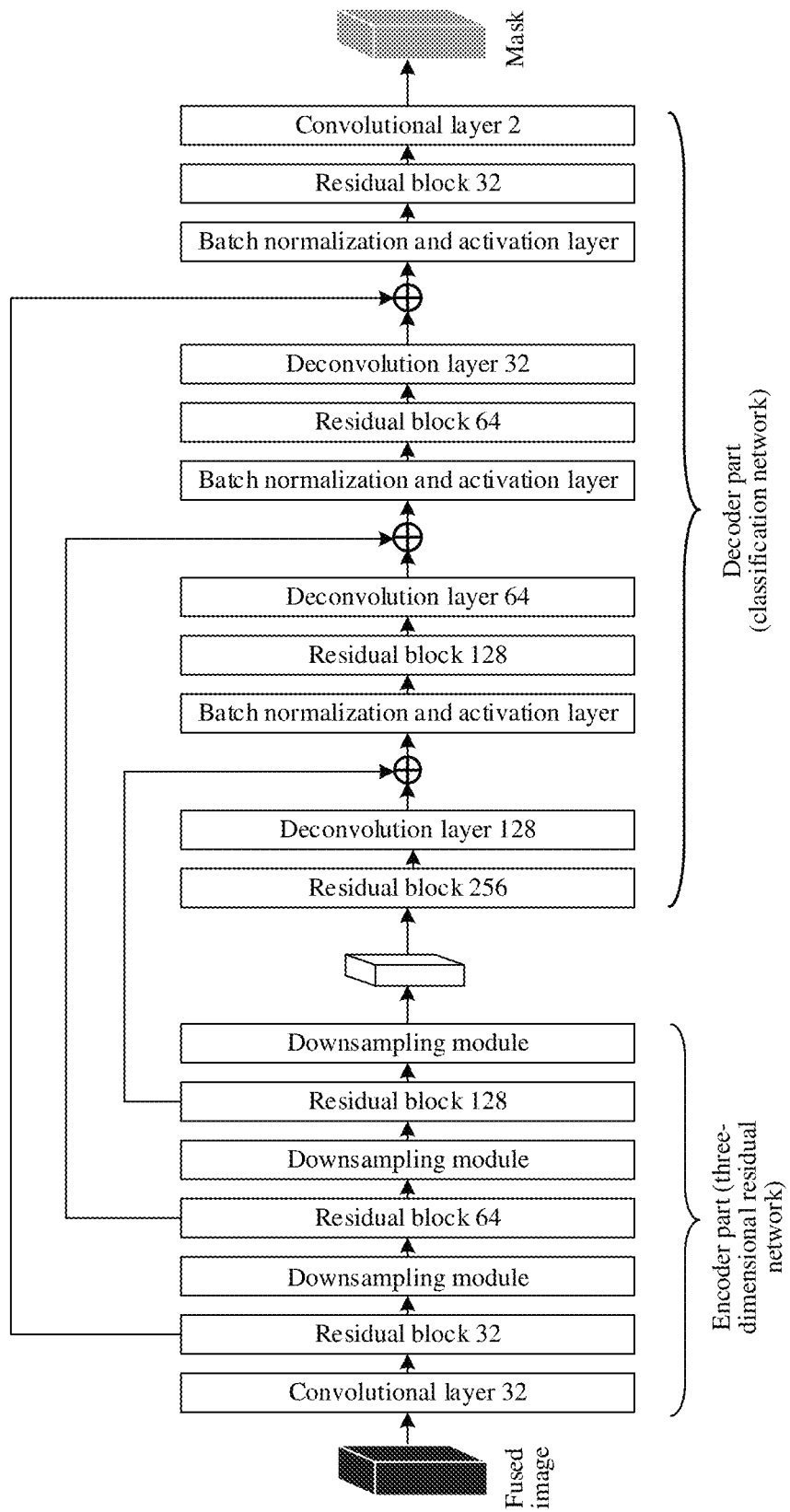
FIG. 3 is an exemplary structural diagram of a three-dimensional fully convolutional network according to an embodiment of this application.

For example, referring to FIG. 3, the three-dimensional residual network includes a convolutional layer with a size of 32 (that is, a size of an inputted/outputted image) and a convolution kernel of 3×3×3 (that is, a convolutional layer 32), a residual block with a size of 32 (that is, a residual block 32), a residual block with a size of 64 (that is, a residual block 64), a residual block with a size of 128 (that is, a residual block 128), and a plurality of downsampling modules, then a process of performing feature extraction on the fused image may as follows:

After convolution is performed on the fused image by using the convolutional layer, a result of the convolution is used as an input of a residual block, i.e., the residual block 32, for feature extraction; then, after a downsampling module performs a downsampling operation on a feature map outputted by the residual block 32, the feature map is used as an input of another residual block, i.e., the residual block 64, for feature extraction of another scale. Similarly, after another downsampling module performs a downsampling operation on a feature map outputted by the residual block 64, the feature map is used as an input of still another residual block, i.e., the residual block 128. After the residual block 128 performs processing, still another downsampling module is used for performing a downsampling operation on a feature map outputted by the residual block 128. By analogy, after feature extraction performed by using a plurality of residual blocks of different sizes and downsampling operations in this way, a plurality of feature maps of different scales (or referred to as different levels) and a final output value of the three-dimensional residual network can be obtained. For ease of description, in this embodiment of this application, the plurality of feature maps and the final output value of the three-dimensional residual network are collectively referred to as feature information.

Step B: Predict a category of each voxel point in the fused image according to the obtained feature information by using the classification network.

A specific structure of the classification network may also be determined according to requirements for an actual application. For example, the classification network may include a plurality of residual blocks and a plurality of deconvolution layers; in addition, the classification network may further include a convolutional layer, a plurality of batch normalization (BN) layers and a plurality of activation function (ReLU) layers (BN and an activation function may alternatively be implemented as the same layer).

Figure 5:
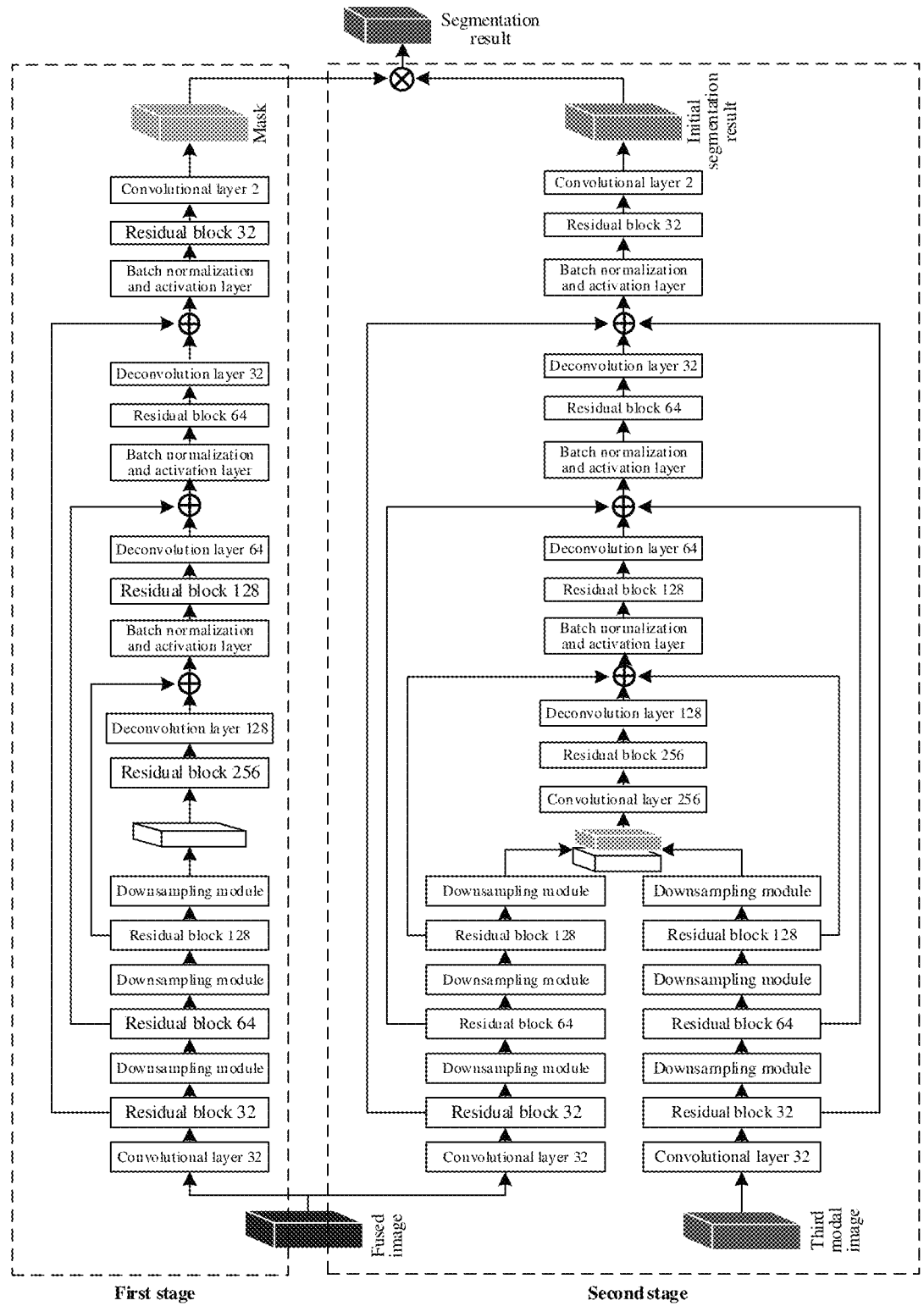
FIG. 5 is an exemplary structural diagram of a brain image segmentation model according to an embodiment of this application.

For example, as shown in FIG. 3 and FIG. 5, the classification network includes: a residual block with a size of 256 (residual block 256), a deconvolution layer with a size of 128 (that is, a deconvolution layer 128), a residual block with a size of 128 (residual block 128), a deconvolution layer with a size of 64 (that is, a deconvolution layer 64), a residual block with a size of 64 (residual block 64), a deconvolution layer with a size of 32 (that is, a deconvolution layer 32), a residual block with a size of 32 (residual block 32), a convolutional layer with a size of 2 and a convolution kernel of 1×1×1 (that is, a convolutional layer 2), and a plurality of BN and activation function layers (that is, batch normalization and activation layers), then a process of predicting categories of voxel points may be as follows:

After the final output value of the three-dimensional residual network is processed by using a residual block, i.e., the residual block 256, a result of the processing is imported to a deconvolution layer i.e., the deconvolution layer 128, for deconvolution; subsequently, a result of the deconvolution and a feature map obtained by the residual block 128 in the residual network are fused, and after batch normalization is performed on a result of the fusion and a nonlinear factor is introduced (the nonlinear factor is introduced by using an activation function), the result of the fusion is used as an input of another residual block of the classification network, i.e., the residual block 128, for processing; similarly, after a deconvolution layer, i.e., the deconvolution layer 64, performs deconvolution on an output of the residual block 128, a result of the deconvolution and a feature map obtained by the residual block 64 of the residual network may be fused. Similarly, after a batch normalization and activation layer performs batch normalization on a result of the fusion and a nonlinear factor is introduced, an output of the batch normalization and activation layer may be used as an input of still another residual block of the classification network, i.e., the residual block 64; after processing performed by the residual block 64 and a deconvolution layer, i.e., the deconvolution layer 32, a deconvolution result and a feature map obtained by the residual block 32 of the residual network are fused; and finally, after a result of the fusion is processed by a batch normalization and activation layer, the residual block 32, and a convolutional layer (that is, the convolutional layer 2), a category of each voxel point in the fused image can be predicted.

The trained three-dimensional fully convolutional network may be obtained by training a plurality of first sample image groups, which may specifically be that: after being trained by another device, the plurality of first sample image groups are provided to a medical image segmentation apparatus (e.g., a brain image segmentation apparatus); alternatively, the training may be performed by the brain image segmentation apparatus, that is, before the step of predicting categories of voxel points in the fused image by using a trained three-dimensional fully convolutional network, the medical image segmentation method (e.g., the brain image segmentation apparatus) may further include:

acquiring a plurality of first sample image groups, the first sample image group including information such as a first modal image sample used for tissue region segmentation and a second modal image sample used for encephalic region identification; and fusing the first modal image sample and the second modal image sample, to obtain a fused image sample; predicting categories of voxel points in the fused image sample by using a preset three-dimensional fully convolutional network, to obtain predicted values; obtaining actual values of the categories of the voxel points in the fused image sample; and converging the three-dimensional fully convolutional network according to the predicted values and the actual values by using a crossentropy loss function, to obtain the trained three-dimensional fully convolutional network.

For example, specifically, a plurality of three-dimensional medical image related to brains may be acquired as an original data set, then pre-processing such as a duplication deletion operation, a cropping operation, a rotating operation, and/or a flipping operation is performed on images of the original data set, to obtain images meeting an input standard of the preset three-dimensional fully convolutional network; and then the pre-processed images are marked with voxel categories, and images belonging to the same brain are added into the same image set, so that each brain corresponds to one image set. These image sets are referred to as first sample image groups in this embodiment of this application.

There may be a plurality of manners of fusing the first modal image sample and the second modal image sample. For example, the first modal image and the second modal image may be fused through feature addition or channel splicing. In addition, the method for predicting the categories of the voxel points in the fused image by using the preset three-dimensional fully convolutional network is also similar to a method for processing the first modal image and the second modal image. For details, refer to the foregoing embodiments, and details are not described herein again.

(3) Screen, according to the predicted categories of the voxel points, voxel points belonging to no encephalic region, to obtain a background voxel set. In one implementation, no encephalic region may refer to a region without any encephalic tissue or a region outside of the encephalic region.

(4) Block the background voxel set on the fused image, to obtain the skull-stripped mask.

For example, specifically, values of voxel points in the encephalic regions may be set to 1, and values of voxel points in the background regions may be set to 0, to obtain the skull-stripped mask.

In this way, the mask and the initial segmentation result are subsequently fused (for example, are multiplied), so that image values in the encephalic regions in the initial segmentation result are maintained unchanged, and image values outside of the encephalic regions are all 0. In other words, a false positive phenomenon in the initial segmentation result can be removed.

103: Separately perform feature extraction on the plurality of modal images, and fusing extracted features.

An example in which the plurality of modal images include a first modal image, a second modal image, and a third modal image are still used. In one implementation, feature extraction may be separately performed on the first modal image, the second modal image, and the third modal image, and extracted features are fused. In another implementation, more than one modal images may be fused first, and then, feature extraction may be performed on the fused modal image. In another implementation, a portion of the plurality of modal images may be fused first, and then, feature extraction may be performed on the fused modal image. An example for at least one of the embodiments may be described below.

The first modal image and the second modal image are fused, to obtain a fused image, feature extraction is separately performed on the fused image and the third modal image by using a trained multi-branch fully convolutional network, and extracted features are fused.

If the first modal image and the second modal image have already been fused and stored in step 102, in this case, a stored fused image may alternatively be directly read without a need to fuse the first modal image and the second modal image again. That is, as shown in FIG. 5, after the first modal image and the second modal image are fused, the fused image may be separately provided at a first stage and a second stage for use.

The trained multi-branch fully convolutional network is another branch of the trained brain image segmentation model provided in this embodiment of this application. A structure of the trained multi-branch fully convolutional network may be set according to requirements for an actual application. For example, the trained multi-branch fully convolutional network may include an upper-branch three-dimensional residual structure, a lower-branch three-dimensional residual structure, and a classification network module, where the part of the upper-branch three-dimensional residual structure and the lower-branch three-dimensional residual structure may alternatively be referred to as an encoder and used for encoding, to perform feature extraction on images; and the classification network module is equivalent to a decoder, and mainly used for decoding, to predict categories of voxel points and perform segmentation.

If the trained multi-branch fully convolutional network includes an upper-branch three-dimensional residual structure, a lower-branch three-dimensional residual structure, and a classification network module, the step "separately performing feature extraction on the fused image and the third modal image by using a trained multi-branch fully convolutional network, and fusing extracted features" may include the following steps:

(1) Perform feature extraction on the fused image by using the upper-branch three-dimensional residual structure, to obtain an upper-branch feature.

The upper-branch three-dimensional residual structure may include an upper-branch convolution module, a first upper-branch residual block, a first upper-branch downsampling module, a second upper-branch residual block, a second upper-branch downsampling module, a third upper-branch residual block, and a third upper-branch downsampling module, then the step of performing feature extraction on the fused image by using the upper-branch three-dimensional residual structure, to obtain an upper-branch feature may include a portion or all of the following steps:

A: performing convolution on the fused image by using the upper-branch convolution module;

B: encoding an output of the upper-branch convolution module by using the first upper-branch residual block, and performing a downsampling operation on a result of the encoding by using the first upper-branch downsampling module;

C: encoding an output of the first upper-branch downsampling module by using the second upper-branch residual block, and performing a downsampling operation on a result of the encoding by using the second upper-branch downsampling module; and D: encoding an output of the second upper-branch downsampling module by using the third upper-branch residual block, and performing a downsampling operation on a result of the encoding by using the third upper-branch downsampling module, to obtain the upper-branch feature.

Network parameters of the upper-branch convolution module, the first upper-branch residual block, the second upper-branch residual block, and the third upper-branch residual block may be set according to requirements for an actual application. For example, referring to FIG. 4 and FIG. 5, the upper-branch convolution module may be set to a convolutional layer with a size of 32 and a convolution kernel size of 3×3×3 (that is, a convolutional layer 32 of an upper branch in FIG. 4); the first upper-branch residual block may be set to a residual block with a size of 32 (that is, a residual block 32 of the upper branch in FIG. 4); the second upper-branch residual block may be set to a residual block with a size of 64 (that is, a residual block 64 of the upper branch in FIG. 4); the third upper-branch residual block may be set to a residual block with a size of 128 (that is, a residual block 128 of the upper branch in FIG. 4); and so on.

(2) Perform feature extraction on the third modal image by using the lower-branch three-dimensional residual structure, to obtain a lower-branch feature.

the lower-branch three-dimensional residual structure includes a lower-branch convolution module, a first lower-branch residual block, a first lower-branch downsampling module, a second lower-branch residual block, a second lower-branch downsampling module, a third lower-branch residual block, and a third lower-branch downsampling module, then the step of performing feature extraction on the third modal image by using the lower-branch three-dimensional residual structure, to obtain a lower-branch feature may include a portion or all of the following steps:

A: performing convolution on the third modal image by using the lower-branch convolution module;

B: encoding an output of the lower-branch convolution module by using the first lower-branch residual block, and performing a downsampling operation on a result of the encoding by using the first lower-branch downsampling module;

C: encoding an output of the first lower-branch downsampling module by using the second lower-branch residual block, and performing a downsampling operation on a result of the encoding by using the second lower-branch downsampling module; and D: encoding an output of the second lower-branch downsampling module by using the third lower-branch residual block, and performing a downsampling operation on a result of the encoding by using the third lower-branch downsampling module, to obtain the lower-branch feature.

Network parameters of the lower-branch convolution module, the first lower-branch residual block, the second lower-branch residual block, and the third lower-branch residual block may be set according to requirements for an actual application. For example, referring to FIG. 4 and FIG. 5, the lower-branch convolution module may be set to a convolutional layer with a size of 32 and a convolution kernel size of 3×3×3 (that is, a convolutional layer 32 of a lower branch in FIG. 4); the first lower-branch residual block may be set to a residual block with a size of 32 (that is, a residual block 32 of the lower branch in FIG. 4); the second lower-branch residual block may be set to a residual block with a size of 64 (that is, a residual block 64 of the lower branch in FIG. 4); the third lower-branch residual block may be set to a residual block with a size of 128 (that is, a residual block 128 of the lower branch in FIG. 4); and so on.

In addition, during extraction of the upper-branch feature and the lower-branch feature, there may be a plurality of manners of the step of performing a downsampling operation on a result of the encoding. For example, a downsampling operation may be performed on the encoding result by using a maximum pooling layer. Another manner may alternatively be used. For example, convolution may be performed on the encoding result by separately using two parallel convolutional layers having the same stride and different convolution kernels; and then a batch normalization layer performs batch normalization on a result obtained through the convolution, to achieve an objective of downsampling.

Network parameters of the two parallel convolutional layers having the same stride and different convolution kernels may specifically be set according to requirements for an actual application. For example, referring to FIG. 6, the stride of the two convolutional layers may be set to 2 (that is, s=2×2×2), and the convolution kernels may be separately set to 3×3×3 and 1×1×1 (referring to "Con 3×3×3, s=2×2×2" and "Con 1×1×1, s=2×2×2" in FIG. 6). The structure for performing the downsampling operation may further include an activation layer, so that a nonlinear factor is added to a result of the batch normalization, to improve feature expression capabilities. For ease of description, the batch normalization layer and the activation layer are collectively referred to as "BN, ReLU" in FIG. 6.

Figure 6:
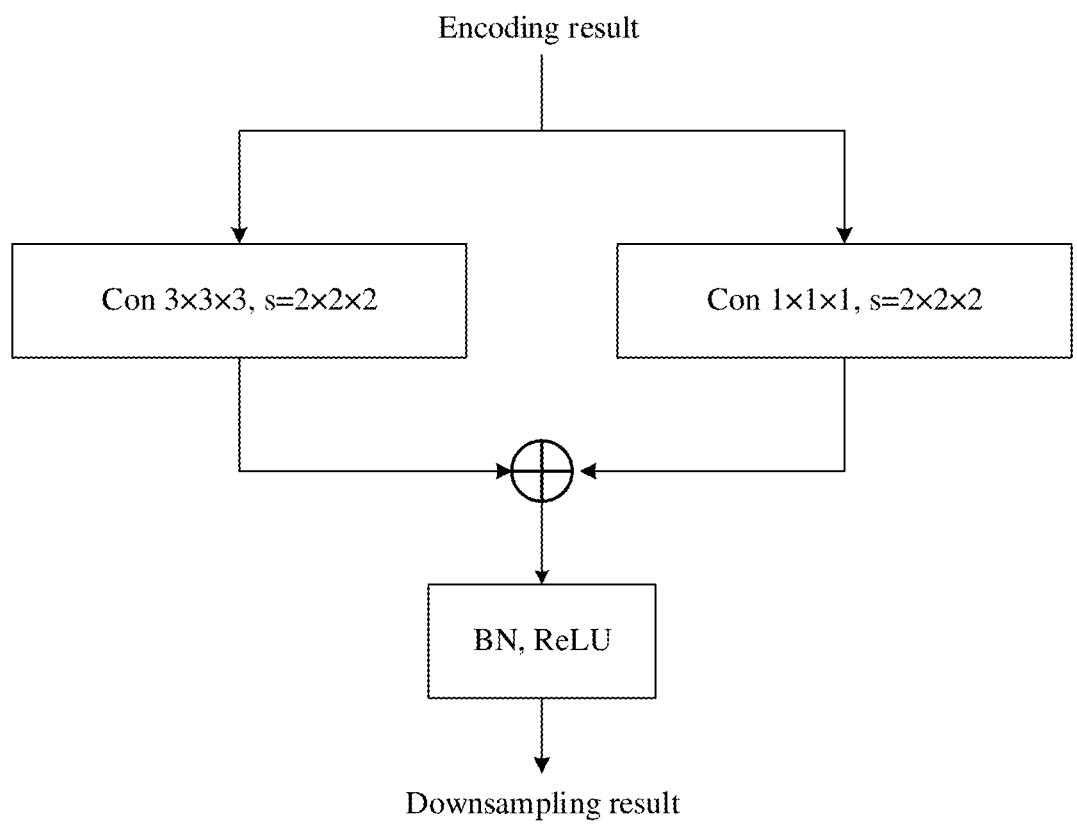
FIG. 6 is an exemplary structural diagram of a downsampling module according to an embodiment of this application.

The "downsampling module" in step 102 may be implemented by using a maximum pooling layer, and may alternatively be implemented by using a downsampling structure shown in FIG. 6. Details are not described herein again.

(3) Fuse the upper-branch feature and the lower-branch feature by using the classification network module.

For example, the fusion may be performed by performing voxel addition or multiplication on the upper-branch feature and the lower-branch feature.

104: Segment encephalic tissues according to a fused feature, to obtain an initial segmentation result. For example, details may be as follows:

The fused feature is classified by using a classification network module, and the encephalic tissues are segmented based on a classification result, to obtain the initial segmentation result.

For example, fused features belonging to a category of "white matter lesion" may be added to the same set according to the classification result, and segmentation is performed based on the set, then a corresponding white matter lesion region can be obtained.

Figure 4:
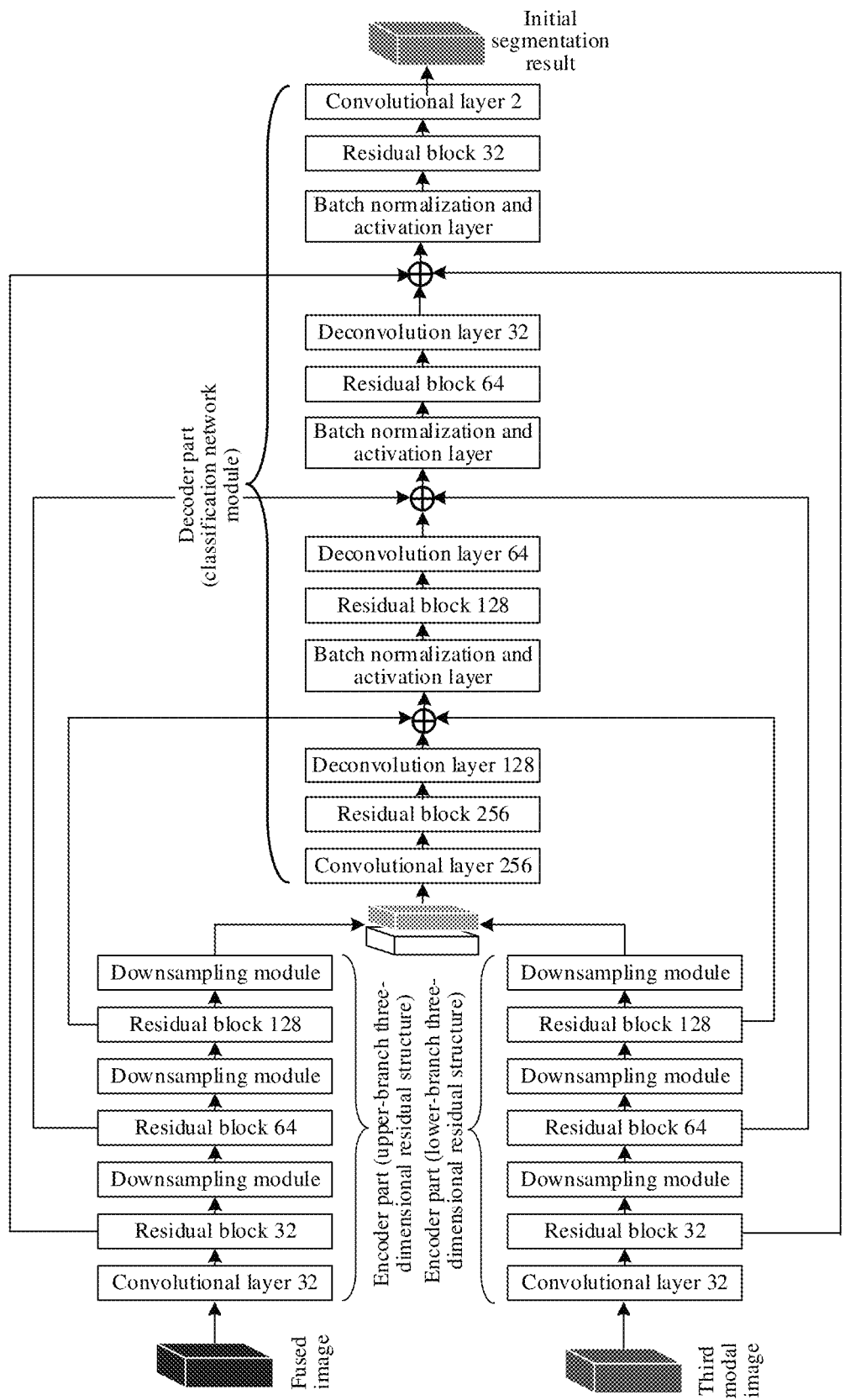
FIG. 4 is an exemplary structural diagram of a multi-branch fully convolutional network according to an embodiment of this application.

For example, as shown in FIG. 4 and FIG. 5, the classification network module includes: a convolutional layer with a size of 256 and a convolution kernel of 1×1×1 (that is, a convolutional layer 256), a residual block with a size of 256 (residual block 256), a deconvolution layer with a size of 128 (that is, a deconvolution layer 128), a residual block with a size of 128 (residual block 128), a deconvolution layer with a size of 64 (that is, a deconvolution layer 64), a residual block with a size of 64 (residual block 64), a deconvolution layer with a size of 32 (that is, a deconvolution layer 32), a residual block with a size of 32 (residual block 32), a convolutional layer with a size of 10 and a convolution kernel of 1×1×1 (that is, a convolutional layer 10), and a plurality of BN and activation function layers (that is, batch normalization and activation layers), then a process of classifying the fused feature may be as follows:

After convolution is performed on the fused feature by using the convolutional layer 256 and an output of the convolutional layer 256 is processed by using the residual block 256, a result of the processing is imported to a deconvolution layer i.e., the deconvolution layer 128, for deconvolution; subsequently, a result of the deconvolution and a feature map obtained by the residual block 128 in the residual network are fused, and after batch normalization is performed on a result of the fusion and a nonlinear factor is introduced, the result of the fusion is used as an input of another residual block of the classification network, i.e., the residual block 128, for processing; similarly, after a deconvolution layer, i.e., the deconvolution layer 64, performs deconvolution on an output of the residual block 128, a result of the deconvolution and a feature map obtained by the residual block 64 of the residual network may be fused. Similarly, after a batch normalization and activation layer performs batch normalization on a result of the fusion and a nonlinear factor is introduced, an output of the batch normalization and activation layer may be used as an input of still another residual block of the classification network, i.e., the residual block 64; after processing performed by the residual block 64 and a deconvolution layer, i.e., the deconvolution layer 32, a deconvolution result and a feature map obtained by the residual block 32 of the residual network are fused; and finally, after a result of the fusion is processed by a batch normalization and activation layer, the residual block 32, and a convolutional layer (that is, the convolutional layer 10), categories of fused features can be obtained.

The trained multi-branch fully convolutional network may be obtained by training a plurality of second sample image groups, which may specifically be that: after being trained by another device, the plurality of second sample image groups are provided to the brain image segmentation apparatus; alternatively, the training may be performed by the brain image segmentation apparatus, that is, before the step of separately performing feature extraction on the fused image and the third modal image by using a trained multi-branch fully convolutional network, the brain image segmentation method may further include a portion or all of the following:

acquiring a plurality of second sample image groups, the second sample image group including a first modal image sample used for tissue region segmentation, a second modal image sample used for encephalic region identification, and a third modal image sample used for protein lesion region identification; fusing the first modal image sample and the second modal image sample, to obtain a fused image sample; separately performing feature extraction on the fused image sample and the third modal image sample by using a preset multi-branch fully convolutional network; fusing extracted features, and classifying a fused feature, to obtain a predicted category value; obtaining an actual category value of the fused feature; and converging the multi-branch fully convolutional network according to the predicted category value and the actual category value by using a multi-categorization loss function, to obtain the trained multi-branch fully convolutional network.

For example, specifically, a plurality of three-dimensional medical image related to brains may be acquired as an original data set, then pre-processing such as a duplication deletion operation, a cropping operation, a rotating operation, and/or a flipping operation is performed on images of the original data set, to obtain images meeting an input standard of the preset multi-branch fully convolutional network; and then the pre-processed images are marked with voxel categories, and images belonging to the same brain are added into the same image set, so that each brain corresponds to one image set. These image sets are referred to as second sample image groups in this embodiment of this application.

If the first modal image and the second modal image have already been fused and stored in step 102, in this case, a stored fused image may alternatively be directly read without a need to fuse the first modal image sample and the second modal image sample again. That is, as shown in FIG. 5, after the first modal image sample and the second modal image sample are fused, the fused image may be separately provided at a first stage and a second stage for use.

Step 102 and step 103 may not be implemented in a particular order, and may be performed in any arbitrary order.

105: Fuse the mask and the initial segmentation result, to obtain a segmentation result corresponding to the to-be-segmented image group.

For example, specifically, element-wise multiplication may be performed for the mask and the initial segmentation result, to obtain the segmentation result corresponding to the to-be-segmented image group. Details may be as follows:

A value of each voxel on the mask and a value of each voxel in the initial segmentation result may be separately obtained, a first matrix is established according to the value of each voxel on the mask, and a second matrix is established according to the value of each voxel in the initial segmentation result. A dot product operation is performed on elements in the first matrix and elements in the second matrix, to obtain the segmentation result corresponding to the to-be-segmented image group.

It can be known from above that, in this embodiment, after a to-be-segmented image group is obtained, on one hand, skull stripping may be performed according to a plurality of modal images in the to-be-segmented image group, to obtain a skull-stripped mask; on the other hand, feature extraction may be separately performed on the plurality of modal images and extracted features are fused, then encephalic tissues are segmented according to a fused feature, and subsequently an initial segmentation result obtained through segmentation and the previously obtained mask are fused, to obtain a final segmentation result. In this solution, during initial segmentation, a manner of first extracting the features of the modal images and then fusing the extracted features is used. Therefore, information contained in modalities can be retained as much as possible, thereby improving expression capabilities of the extracted features. In addition, the mask obtained through skull stripping may further be used to remove a false positive phenomenon (a category of a pixel is misjudged, for example, a pixel is background, but is regarded as a target object during segmentation, and this phenomenon is referred to as false positive) in the segmentation result obtained through the initial segmentation. Therefore, compared with a solution in which the modal images are directly fused and skull stripping is directly performed, and then segmentation is performed based on a result of the stripping, this solution can improve feature expression capabilities and segmentation accuracy.

According to the method described in the previous embodiment, the following further provides detailed description by using an example.

Figure 7:
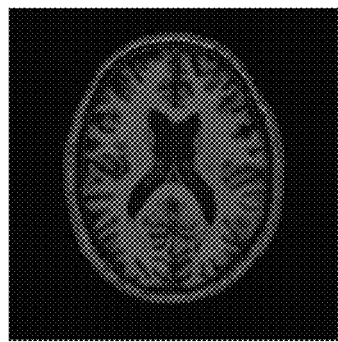
FIG. 7 is a schematic diagram of a plurality of modal images according to an embodiment of this application.
Figure 7:
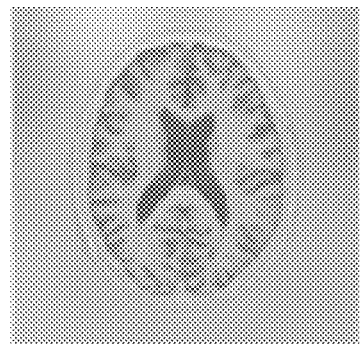
Figure 7:

In this embodiment, an example in which the brain image segmentation apparatus is integrated into a network device, and the first modal image is specifically a T1 image in magnetic resonance modal images, the second modal image is specifically a T1_IR image in magnetic resonance modal images, and the third modal image is specifically a T2 image in magnetic resonance modal images is used for description. As shown in FIG. 7, the T1 image is generally used for tissue region segmentation, the T1_IR image is generally used for encephalic region identification (that is, skull stripping), and the T2 image is generally used for protein lesion region identification.

(A) Training of a brain image segmentation model.

The brain image segmentation model may include a three-dimensional fully convolutional network and multi-branch fully convolutional network, and training of the three-dimensional fully convolutional network and the multi-branch fully convolutional network may be as follows:

(1) Training of the three-dimensional fully convolutional network.

First, the network device may acquire a plurality of first sample image groups. Each first sample image group may include images under a plurality of modalities (that is, a plurality of modal images) of the brain of the same object such as the same person, for example, a T1 image and a T1_IR image. In addition, each modal image is marked with actual categories of voxel points.

After the plurality of first sample image groups are acquired, the network device may use some of the first sample image groups as a training dataset, and use the others as a verification dataset. For example, the first sample image groups may be randomly divided into a training dataset and a verification dataset at a ratio of 4:1. Subsequently, a preset three-dimensional fully convolutional network may be trained by using the training dataset, and verification is performed by using the verification dataset, to obtain a trained three-dimensional fully convolutional network.

A process of training the preset three-dimensional fully convolutional network by using the training dataset by the network device may be as follows:

A1: The network device fuses the T1 image and the T1_IR image in the first sample image group, to obtain a fused image sample.

For example, the network device may fuse the T1 image and the T1_IR image through feature addition or channel splicing, to obtain a fused image sample.

A2: The network device predicts categories of voxel points in the fused image sample by using the preset three-dimensional fully convolutional network, to obtain predicted values.

An encoder part of the three-dimensional fully convolutional network may be implemented by using a three-dimensional residual network, and may specifically include a convolutional layer, a plurality of residual blocks, a plurality of downsampling modules, and the like; and a decoder part may be implemented by a classification network, and may specifically include a plurality of residual blocks and a plurality of deconvolution layers. In addition, the decoder part may further include a convolutional layer, a plurality of batch normalization (BN) layers and a plurality of activation (ReLU) layers (BN and an activation function may alternatively be implemented as the same layer—a batch normalization and activation layer, for example, for details, reference may be made to FIG. 3, FIG. 5, and FIG. 9).

For example, the network device may import the fused image to the three-dimensional residual network of the three-dimensional fully convolutional network, to perform feature extraction, to obtain feature information. Subsequently, the feature information is processed by using the classification network of the three-dimensional fully convolutional network, to predict a category of each voxel point in the fused image, to obtain predicted values of categories of voxel points in the fused image.

A3: The network device determines actual values of the categories of the voxel points in the fused image according to marks of modal images in the first sample image group.

A4: Converge the three-dimensional fully convolutional network according to the predicted values and the actual values by using a crossentropy loss function, to obtain the trained three-dimensional fully convolutional network.

The trained three-dimensional fully convolutional network may further be verified and adjusted by using the verification dataset, to improve accuracy of the two-dimensional segmentation model.

(2) Training of the multi-branch fully convolutional network.

First, the network device may acquire a plurality of second sample image groups. Each second sample image group may include images under a plurality of modalities of the brain of the same object such as the same person, for example, a T1 image, a T1_IR image, and a T2 image. In addition, each modal image is marked with actual categories of voxel points.

Similar to the acquired first sample image groups, after the plurality of second sample image groups are acquired, the network device may also use some of the second sample image groups as a training dataset, and use the others as a verification dataset. For example, the second sample image groups may be randomly divided into a training dataset and a verification dataset at a ratio of 4:1. Subsequently, a preset multi-branch fully convolutional network may be trained by using the training dataset, and verification is performed by using the verification dataset, to obtain a trained multi-branch fully convolutional network.

A process of training the preset multi-branch fully convolutional network by using the training dataset by the network device may be as follows:

B1: The network device fuses the T1 image and the T1_IR image in the second sample image group, to obtain a fused image sample.

For example, the T1 image and the T1_IR image may be fused through feature addition or channel splicing, to obtain a fused image sample.

B2: The network device separately performs feature extraction on the fused image sample and the third modal image sample by using a preset multi-branch fully convolutional network, and fuses extracted features.

The encoder part of the multi-branch fully convolutional network may include an upper-branch three-dimensional residual structure and a lower-branch three-dimensional residual structure, and the decoder part may be implemented by a classification network module and the like. For example, a specific structure of the multi-branch fully convolutional network is shown in FIG. 4. The upper-branch three-dimensional residual structure is used for performing feature extraction on the fused image sample, to obtain an upper-branch feature; and the lower-branch three-dimensional residual structure is used for performing feature extraction on the T2 image, to obtain a lower-branch feature. The classification network module is configured to fuse the upper-branch feature and the lower-branch feature, and classify and segment a fused feature (that is, implement step B3).

Network structures of the upper-branch three-dimensional residual structure and the lower-branch three-dimensional residual structure are similar, and a quantity of convolutional layers, a quantity of residual blocks, and network parameters of the layers may specifically be set according to requirements for an actual application. For example, referring to FIG. 4, FIG. 5, and FIG. 9, the structures thereof may be as follows:

The upper-branch three-dimensional residual structure includes: an upper-branch convolution module, a first upper-branch residual block, a first upper-branch downsampling module, a second upper-branch residual block, a second upper-branch downsampling module, a third upper-branch residual block, and a third upper-branch downsampling module.

The lower-branch three-dimensional residual structure includes: a lower-branch convolution module, a first lower-branch residual block, a first lower-branch downsampling module, a second lower-branch residual block, a second lower-branch downsampling module, a third lower-branch residual block, and a third lower-branch downsampling module.

For details of processes of extracting features by the upper-branch three-dimensional residual structure and the lower-branch three-dimensional residual structure, reference may be made to the foregoing embodiments. Details are not described herein again.

A structure of the classification network module may also be set according to requirements for an actual application, and may specifically include, for example, a plurality of convolutional layers, a plurality of residual blocks, a plurality of deconvolution layers, a plurality of batch normalization and activation layers. For details, reference may be made to the foregoing embodiments. Details are not described herein again.

B3: The network device classifying a fused feature, to obtain a predicted category value;

For example, the network device may specifically classify the fused feature by using the classification network module in the multi-branch fully convolutional network, to obtain the predicted category value.

B4: The network device determines an actual category value of the fused feature according to marks of modal images in the second sample image group.

The marks of the modal images may be marked by medical staff according to a gold standard. The gold standard is a method for determining a disease in clinical medicine community.

B5: The network device converges the multi-branch fully convolutional network according to the predicted category value and the actual category value by using a multi-categorization loss function, to obtain the trained multi-branch fully convolutional network.

Because a common loss function such as crossentropy is prone to miss a white matter lesion region, convergence may be performed by using a multi-categorization loss function. Specific parameters of the multi-categorization loss function may be set according to requirements for an actual application. For example, if there are N categories of brain regions that need to be segmented (for example, a protein lesion region and a gray matter region need to be classified), the following formula may be used as the multi-categorization loss function L(j):

$$L(j) = \frac{\sum_{i=1}^{N} p_{ij} g_{ij}}{\sum_{i=1}^{N} p_{ij} g_{ij} + 0.5 \sum_{i=1}^{N} \sum_{k \neq j} p_{ik}(1 - g_{ik}) + 0.5 \sum_{i=1}^{N} (1 - p_{ij}) g_{ij}}$$

where i is a voxel point, j and k are categories of voxel points, p is a predicted category value, and g is an actual category value (for example, a gold standard provided by a doctor). For example, $p_{ij}$ represents "a predicted category value corresponding to a case that a pixel point i is used as a voxel point belonging to a category j", and $g_{ij}$ represents "an actual category value corresponding to a case that the pixel point i is used as a voxel point belonging to the category j"; and $p_{ik}$ represents "a predicted category value corresponding to a case that the pixel point i is used as a voxel point belonging to a category k", and $g_{ik}$ represents "an actual category value corresponding to a case that the pixel point i is used as a voxel point belonging to the category k".

The trained multi-branch fully convolutional network may further be verified and adjusted by using the verification dataset, to improve accuracy of the two-dimensional segmentation model.

Figure 8:
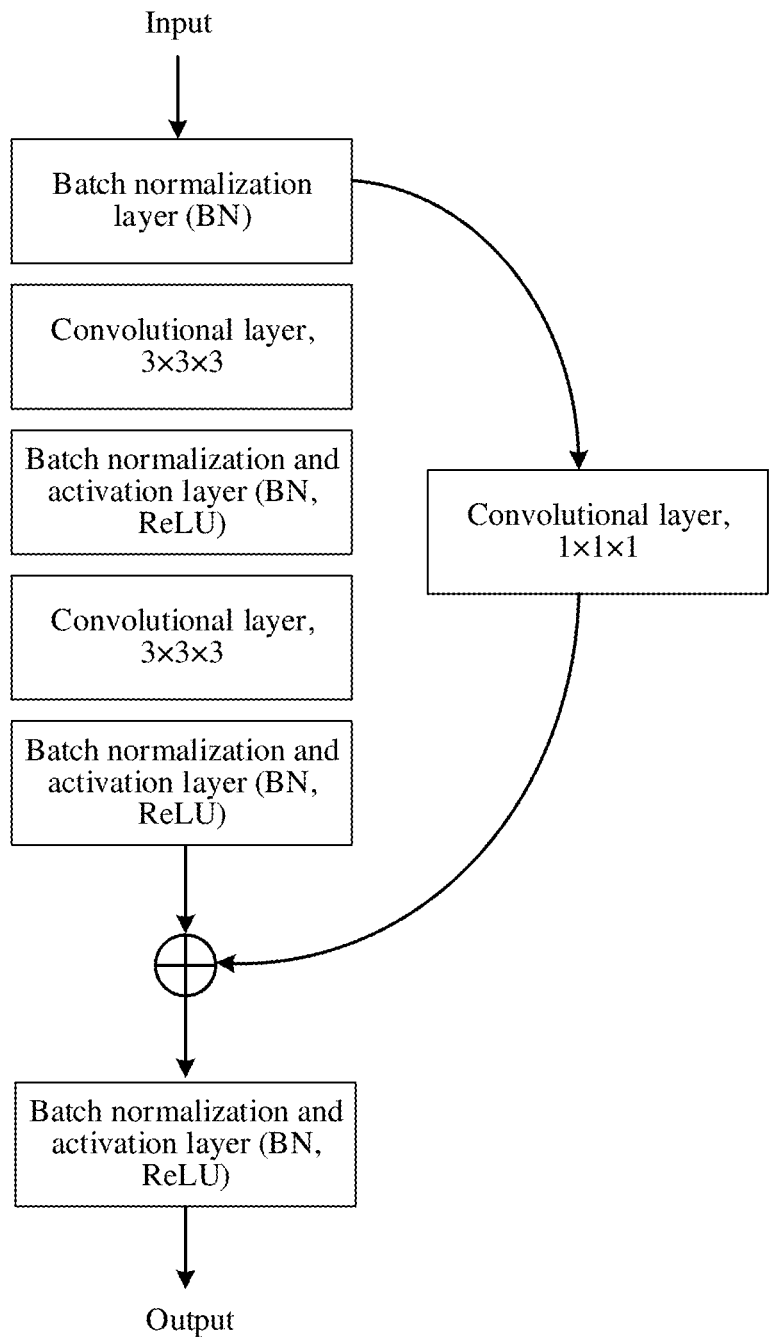
FIG. 8 is a schematic structural diagram of a residual block according to an embodiment of this application.

In addition, to further improve expression capabilities of the features, residual blocks in the three-dimensional fully convolutional network and the multi-branch fully convolutional network (for example, residual blocks in the three-dimensional fully convolutional network, the first upper-branch residual block, the second upper-branch residual block, and the third upper-branch residual block in the upper-branch three-dimensional residual structure, the first lower-branch residual block, the second lower-branch residual block, and the third lower-branch residual block in the lower-branch three-dimensional residual structure, and residual blocks in the classification network module) may not only use a residual unit structure in a three-dimensional U-Net, but also use a residual block structure shown in FIG. 8. As shown in FIG. 8, the residual block may include two branches, where one branch may sequentially include a batch normalization (BN) layer, a convolutional layer with a convolution kernel of 3×3×3, a batch normalization and activation (BN, ReLU) layer, another convolutional layer with a convolution kernel of 3×3×3 and another batch normalization and activation layer; and the other branch may include a convolutional layer with a convolution kernel of 1×1×1. When input data of the residual block is processed by separately using the two branches, processing results obtained by the two branches are fused, and a result obtained through the fusion is processed by using still another batch normalization and activation layer, then a final output of the residual block can be obtained.

(B) The to-be-segmented image group may be segmented by using the trained brain image segmentation model, to obtain a required segmentation result. For details, reference may be made to FIG. 9.

Figure 9:
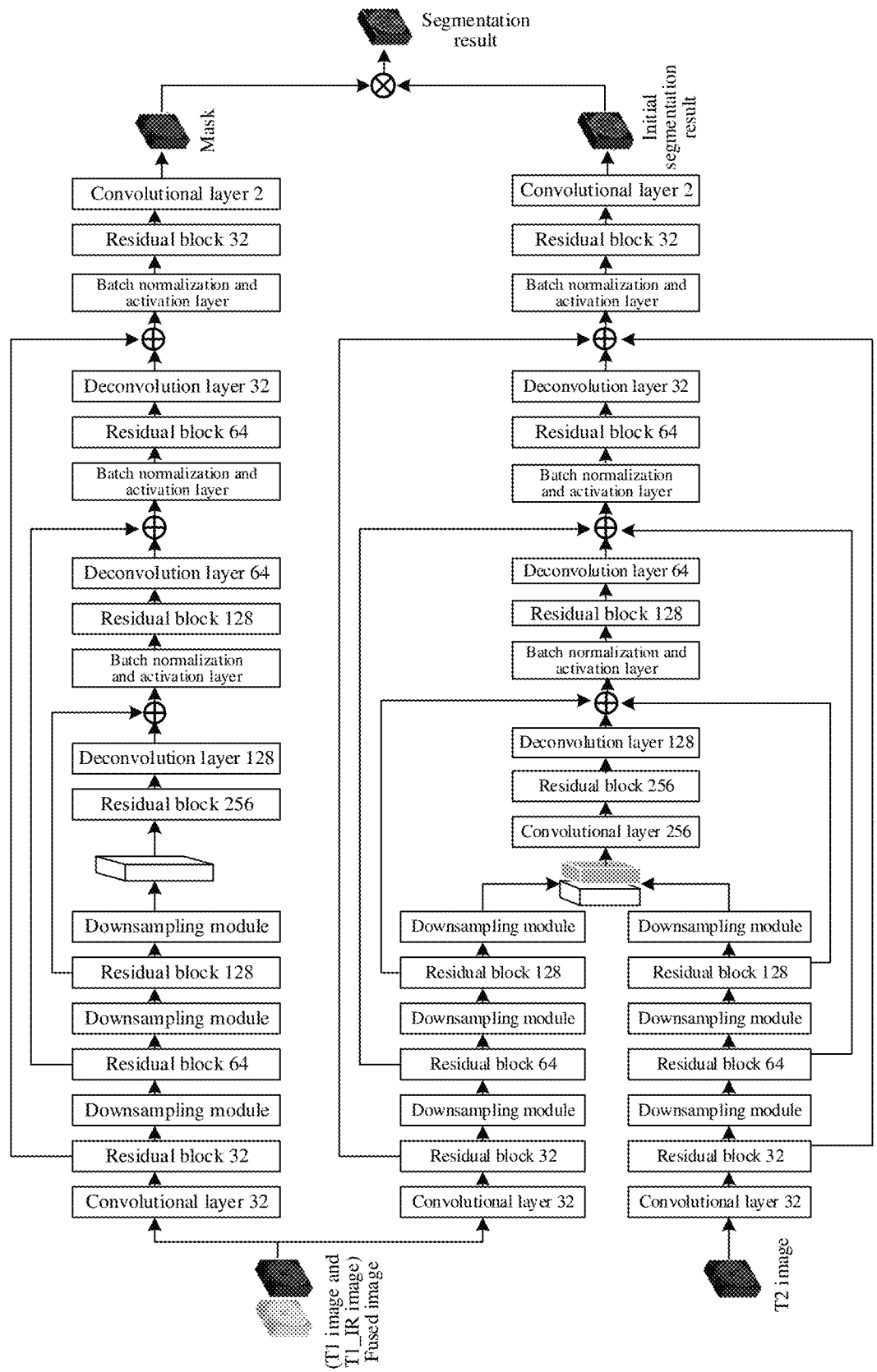
FIG. 9 is another exemplary structural diagram of a brain image segmentation model according to an embodiment of this application.
Figure 10:
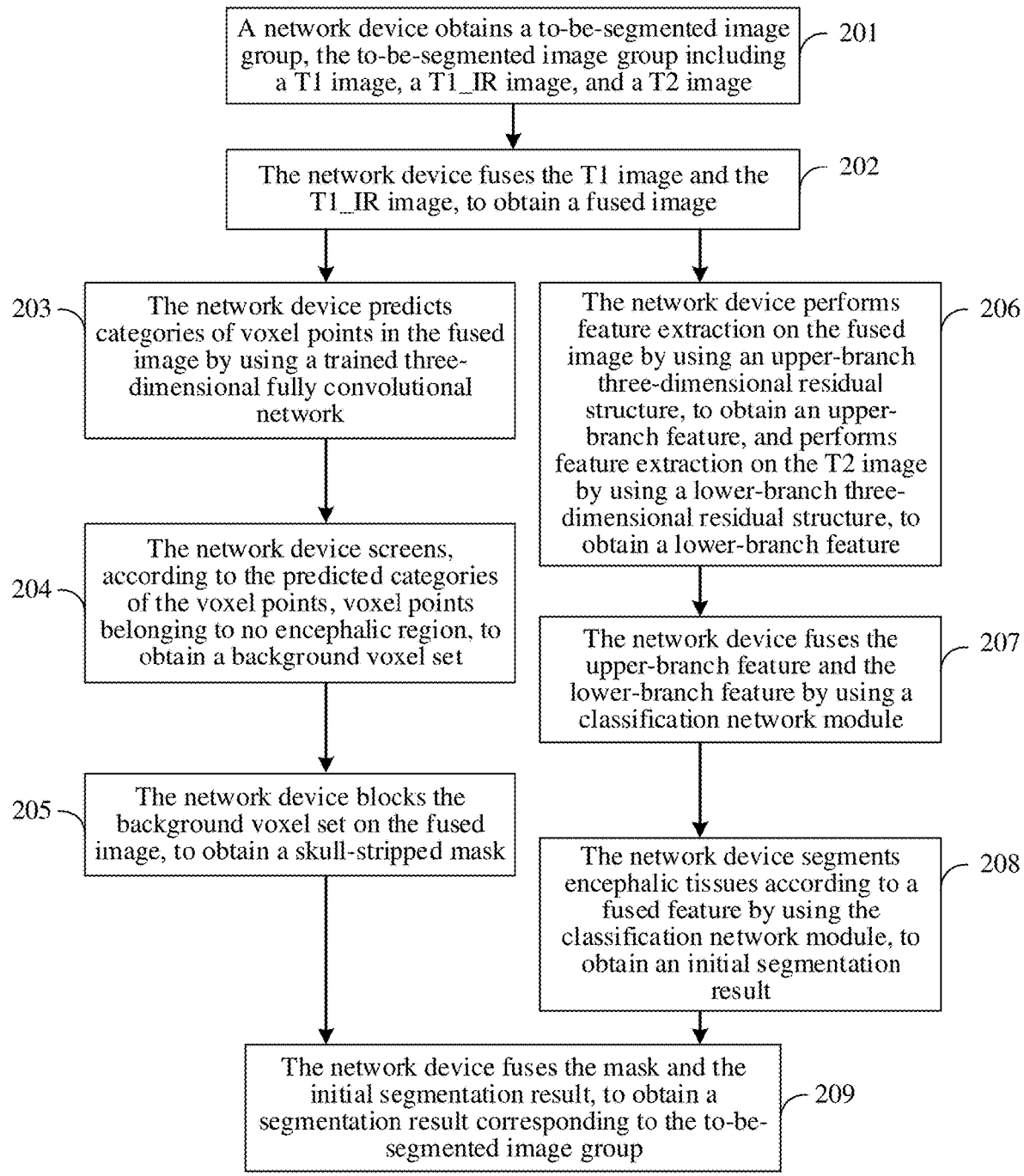
FIG. 10 is another flowchart of a brain image segmentation method according to an embodiment of this application.
Figure 14:
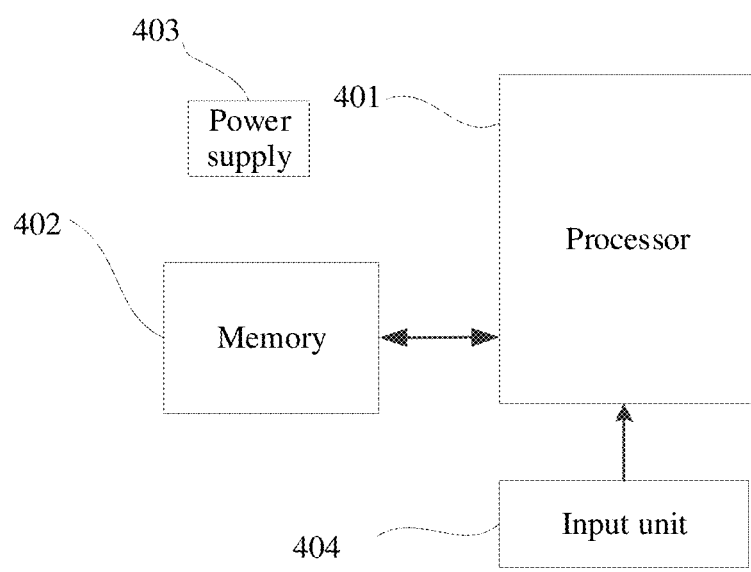
FIG. 14 is a schematic structural diagram of a network device according to an embodiment of this application.

As shown in FIG. 9 and FIG. 10, a brain image segmentation method is provided, performed by a network device shown in FIG. 14. A specific process may be as follows:

201: A network device obtains a to-be-segmented image group. The to-be-segmented image group may include a plurality of modal images, such as a T1 image, a T1_IR image, and a T2 image.

For example, image acquisition may specifically be performed by medical image acquisition devices such as a CT or a magnetic resonance imaging device for the brain of a person who requires a brain image detection, and then a plurality of acquired modal images related to the brain, such as a T1 image, a T1_IR image, and a T2 image, are provided to the network device as a to-be-segmented image group.

202: The network device fuses the T1 image and the T1_IR image, to obtain a fused image.

There may be a plurality of specific fusion manners. For example, the network device may fuse the T1 image and the T1_IR image through feature addition or channel splicing, to obtain a fused image.

203: The network device predicts categories of voxel points in the fused image by using a trained three-dimensional fully convolutional network. Then step 204 is performed.

For example, the network device performs feature extraction on the fused image by using a three-dimensional residual network in the trained three-dimensional fully convolutional network, to obtain feature information, and subsequently predicts a category of each voxel point in the fused image according to the obtained feature information by using a classification network in the trained three-dimensional fully convolutional network. A structure of the trained three-dimensional fully convolutional network shown in FIG. 9 is used as an example, then the process may specifically be as follows:

(1) Encoder part (three-dimensional residual network):

As shown in FIG. 9, after fusing the T1 image and the T1_IR image, the network device may perform convolution on a fused image by using a convolutional layer 32, and a result of the convolution is used as an input of a residual block 32 for feature extraction; then, after a downsampling module performs a downsampling operation on a feature map outputted by the residual block 32, the feature map is used as an input of a residual block 64 for feature extraction of another scale. Similarly, after another downsampling module performs a downsampling operation on a feature map outputted by the residual block 64, the feature map is used as an input of a residual block 128. After the residual block 128 performs processing, still another downsampling module is used for performing a downsampling operation on a feature map outputted by the residual block 128. By analogy, after feature extraction performed by using a plurality of residual blocks of different sizes and downsampling operations in this way, feature information can be obtained, the feature information including a final output value of the three-dimensional residual network, and a plurality of feature maps of different scales, such as the feature map obtained by the residual block 32 in the residual network, the feature map obtained by the residual block 64 in the residual network, and the feature map obtained by the residual block 128 in the residual network.

In the foregoing decoding process, there may be a plurality of manners of implementing the "downsampling operation". For example, the downsampling operation may be performed by using a maximum pooling layer. Alternatively, another manner may be used. For example, an objective of downsampling may be implemented by separately using the structure shown in FIG. 6. For details, reference may be made to the foregoing embodiments, and details are not described herein again.

(2) Decoder part (classification network):

As shown in FIG. 9, after the feature information is obtained, the network device may process the final output value of the three-dimensional residual network by using a residual block 256, import a result of the processing to a deconvolution layer 128 for deconvolution, subsequently fuse a result of the deconvolution and a feature map obtained by a residual block 128 in the residual network, and after performing batch normalization on a result of the fusion and introducing a nonlinear factor, use the result of the fusion as an input of a residual block 128 of the classification network for processing. Similarly, after a deconvolution layer 64 performs deconvolution on an output of the residual block 128, a result of the deconvolution and a feature map obtained by the residual block 64 of the residual network may be fused. Similarly, after a "batch normalization and activation layer" performs batch normalization on a result of the fusion and a nonlinear factor is introduced, an output of the "batch normalization and activation layer" may be used as an input of a residual block 64 of the classification network; after processing performed by the residual block 64 and a deconvolution layer 32, a deconvolution result and a feature map obtained by the residual block 32 of the residual network are fused; and finally, after a result of the fusion is processed by a "batch normalization and activation layer", the residual block 32, and a convolutional layer 2, a category of each voxel point in the fused image can be predicted. Certainly, a corresponding category probability can further be obtained. For example, it can be obtained that: a category of a voxel point K1 is "encephalic region", and a category probability is "80%"; a category of a voxel point K2 is "encephalic region", and a category probability is "60%"; a category of a voxel point K3 is "background region", and a category probability is "95%", and so on.

204: The network device screens, according to the predicted categories of the voxel points, voxel points belonging to no encephalic region, to obtain a background voxel set. Then step 205 is performed. In one implementation, no encephalic region may refer to a region without any encephalic tissue or a region outside of the encephalic region.

For example, if it is obtained that: a category of the voxel point K3 is "background region", and a category probability thereof is "95%" in step 203, in this case, it can be determined that the voxel point K3 is not a voxel point in encephalic regions. Then the voxel point K3 is added to a background voxel set.

205: The network device blocks the background voxel set on the fused image, to obtain a skull-stripped mask. Then step 209 is performed.

For example, the network device may set values of voxel points in the encephalic regions to 1, and set values of voxel points in the background regions to 0, to obtain the skull-stripped mask, referring to FIG. 9.

An example in which the voxel points K1 and K2 are voxel points in the encephalic regions and the voxel point K3 is a voxel point in the background regions is still used. In this case, values of the voxel points K1 and K2 may be set to 1 and a value of the voxel point K3 may be set to 0 on the fused image. By analogy, a similar operation may be performed on other voxel points, and the skull-stripped mask can be obtained. In this way, the mask and the initial segmentation result are subsequently fused (for example, are multiplied), so that image values in the encephalic regions in the initial segmentation result are maintained unchanged, and image values in the background regions are all 0. In other words, a false positive phenomenon in the initial segmentation result can be removed.

206: The network device performs feature extraction on the fused image (that is, a fused image of the T1 image and the T1_IR image) by using an upper-branch three-dimensional residual structure in the trained multi-branch fully convolutional network, to obtain an upper-branch feature, and performs feature extraction on the T2 image by using a lower-branch three-dimensional residual structure, to obtain a lower-branch feature. Then step 207 is performed. For example, details may be as follows:

(1) Extraction of the upper-branch feature.

As shown in FIG. 9, after fusing the T1 image and the T1_IR image, the network device may first perform convolution on a fused image by using an upper-branch convolution module, then encode an output of the upper-branch convolution module by using a first upper-branch residual block, perform a downsampling operation on a result of the encoding by using a first upper-branch downsampling module, subsequently continue to encode an output of the first upper-branch downsampling module by using a second upper-branch residual block, and perform a downsampling operation on a result of the encoding by using a second upper-branch downsampling module; and finally encode an output of the second upper-branch downsampling module by using a third upper-branch residual block, and perform a downsampling operation on a result of the encoding by using the third upper-branch downsampling module. Then the upper-branch feature can be obtained.

(2) Extraction of the lower-branch feature.

As shown in FIG. 9, similar to extraction of the upper-branch feature, the network device may first perform convolution on the T2 image by using a lower-branch convolution module, then encode an output of the lower-branch convolution module by using a first lower-branch residual block, and perform a downsampling operation on a result of the encoding by using a first lower-branch downsampling module; then continue to encode an output of the first lower-branch downsampling module by using a second lower-branch residual block, and perform a downsampling operation on a result of the encoding by using a second lower-branch downsampling module; and finally encode an output of the second lower-branch downsampling module by using a third lower-branch residual block, and perform a downsampling operation on a result of the encoding by using the third lower-branch downsampling module. Then the lower-branch feature can be obtained.

During extraction of the upper-branch feature and the lower-branch feature, there may be a plurality of manners for the step "performing a downsampling operation on a result of the encoding". For example, the downsampling operation may be performed on the encoding result by using a maximum pooling layer. Alternatively, another manner may be used. For example, convolution may be performed on the encoding result by separately using two parallel convolutional layers having the same stride and different convolution kernels; and then a batch normalization layer performs batch normalization on a result obtained through the convolution, to achieve an objective of downsampling. For details, reference may be made to the foregoing embodiments, and details are not described herein again.

Step 203 and step 206 may not be implemented in a particular order in this embodiment. In addition, in step 206, extraction processes of the upper-branch feature and the lower-branch feature may also not be implemented in a particular order. Details are not described herein again.

207: The network device fuses the upper-branch feature and the lower-branch feature by using a classification network module of the trained multi-branch fully convolutional network. Then step 208 is performed.

For example, as shown in FIG. 9, the upper-branch feature and the lower-branch feature may specifically be fused through voxel addition or multiplication by using the classification network module.

208: The network device segments encephalic tissues according to a fused feature by using the classification network module in the trained multi-branch fully convolutional network, to obtain an initial segmentation result. Then step 209 is performed.

For example, the network device may classify the fused feature by using a classification network module, and then segment the encephalic tissues based on a classification result, to obtain the initial segmentation result.

For example, a category of a voxel S1 in the fused feature is "white matter lesion", and a category probability is 90%; a category of a voxel S2 is "gray matter", and a category probability is 87%; a category of a voxel S3 is "white matter", and a category probability is 79%; a category of a voxel S4 is "white matter lesion", and a category probability is 88%; and a category of a voxel S5 is "gray matter", and a category probability is 75%. In this case, the voxels S1 and S4 belonging to the category "white matter lesion" may be added to the same set, i.e., a "white matter lesion voxel set", the voxel S3 belonging to the category "white matter" may be added to a set, i.e., a "white matter voxel set", and the voxels S2 and S5 belonging to the category of "gray matter" may be added to a set, i.e., a "gray matter voxel set". Then region segmentation is performed separately based on the voxel sets, and a corresponding "white matter lesion region", a "white matter region", and a "gray matter region" can be obtained.

The white matter herein means cerebral white matter, and the gray matter herein means cerebral gray matter. It is well known that a brain includes tens of billions of neurons, the neuron includes cell bodies and nerve fibers, there is a cell nucleus (with a dark color) in the cell body, and there is cytoplasm (with a light color) in the nerve fiber. In a brain, cell bodies accumulate on the surface layer of the brain, and look dark-colored, so that this part is generally referred to as cerebral gray matter, and nerve fibers accumulate inside the brain, and look light-colored, so as to be generally referred to as cerebral white matter.

209: The network device fuses the mask obtained in step 205 and the initial segmentation result obtained in step 208, to obtain a segmentation result corresponding to the to-be-segmented image group.

Figure 11:
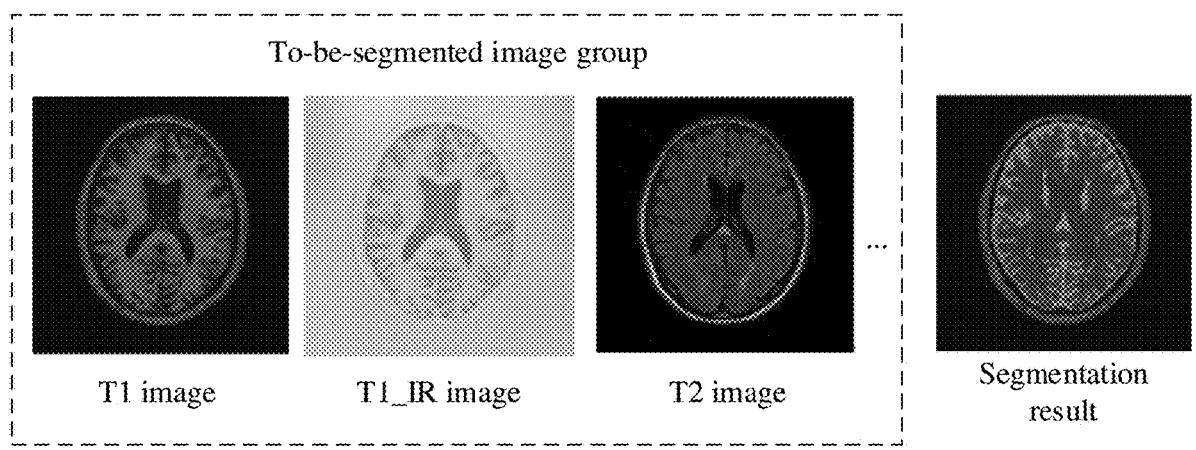
FIG. 11 is a comparison diagram of a to-be-segmented image group and a segmentation result according to an embodiment of this application.

For example, the network device may perform element-wise multiplication for the mask and the initial segmentation result, to obtain the segmentation result corresponding to the to-be-segmented image group. Details may be as follows:

The network device separately obtains a value of each voxel on the mask and a value of each voxel in the initial segmentation result, establishes a first matrix according to the value of each voxel on the mask, and establishes a second matrix according to the value of each voxel in the initial segmentation result; and then performs a dot product operation on elements in the first matrix and elements in the second matrix, to obtain the segmentation result corresponding to the to-be-segmented image group, referring to FIG. 11.

After the segmentation result is obtained, the segmentation result may be provided to a corresponding user, for example, medical staff, for a further operation. For example, the medical staff may find a "white matter lesion region" based on the segmentation result, to determine whether the segmentation is accurate, or judge a situation of a patient, for example, whether the patient has Parkinson's disease or multiple sclerosis and a degree thereof.

It can be known from above that, in this embodiment, after a to-be-segmented image group is obtained, on one hand, skull stripping may be performed according to a T1 image and a T1_IR image in the to-be-segmented image group, to obtain a skull-stripped mask; on the other hand, feature extraction may be separately performed on the T1 image, the T1_IR image, and a T2 image, and extracted features are fused, then encephalic tissues are segmented according to a fused feature, and subsequently an initial segmentation result obtained through segmentation and the previously obtained mask are fused, to obtain a final segmentation result. In this solution, during initial segmentation, a manner of first extracting the features of the modal images and then fusing the extracted features is used. Therefore, information contained in modalities can be retained as much as possible, thereby improving expression capabilities of the extracted features. In addition, the mask obtained through skull stripping may further be used to remove a false positive phenomenon in the segmentation result obtained through the initial segmentation. Therefore, compared with a solution in which the modal images are directly fused and skull stripping is directly performed, and then segmentation is performed based on a result of the stripping, this solution can improve feature expression capabilities and segmentation accuracy.

In addition, during skull stripping in this solution, a three-dimensional fully convolutional network is used. Therefore, compared with a solution in which skull stripping is performed by using software, it is unnecessary to set a large quantity of software parameters and perform a complex parameter adjustment operation. Therefore, this solution is simpler to be implemented, and can avoid a problem of an undesirable stripping result caused by improper settings, thereby helping to improve segmentation accuracy.

To better implement the foregoing method, the embodiments of this application further provide a brain image segmentation apparatus. The brain image segmentation apparatus may be integrated into a network device. The network device may be a server device, a terminal, or another device.

Figure 12:
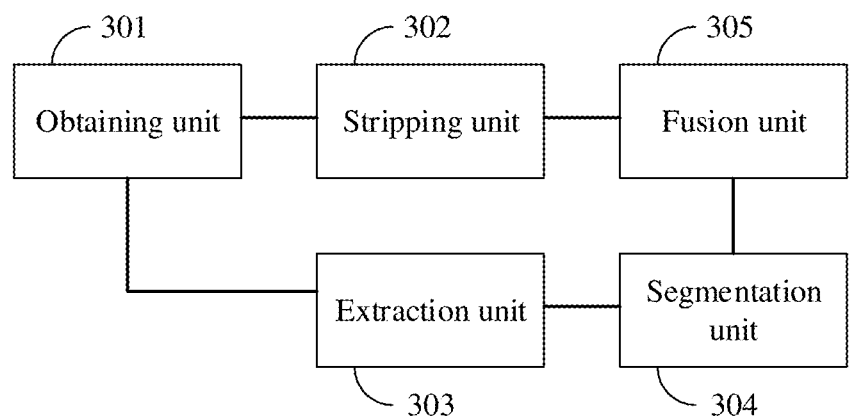
FIG. 12 is a schematic structural diagram of a brain image segmentation apparatus according to an embodiment of this application.

For example, as shown in FIG. 12, the brain image segmentation apparatus may include an obtaining unit 301, a stripping unit 302, an extraction unit 303, a segmentation unit 304, and a fusion unit 305 as follows:

(1) The obtaining unit 301

The obtaining unit 301 is configured to obtain a to-be-segmented image group, the to-be-segmented image group including a plurality of modal images of a brain.

For example, the obtaining unit 301 may specifically be configured to receive a to-be-segmented image group sent by medical image acquisition devices such as a CT or a magnetic resonance imaging device. Each to-be-segmented image group may be acquired by medical image acquisition devices for the brain of the same object such as the same person.

(2) Stripping unit 302

The stripping unit 302 is configured to perform skull stripping according to the plurality of modal images, to obtain a skull-stripped mask.

During skull stripping, all the modal images or some of the modal images may be used. For example, the plurality of modal images include a first modal image, a second modal image, and a third modal image, and in this case:

The stripping unit 302 is specifically configured to perform skull stripping according to the first modal image and the second modal image, to obtain a skull-stripped mask.

For example, in some embodiments, the stripping unit 302 may be specifically configured to: fuse the first modal image and the second modal image, to obtain a fused image; predict categories of voxel points in the fused image by using a trained three-dimensional fully convolutional network; screen, according to the predicted categories of the voxel points, voxel points belonging to no encephalic region, to obtain a background voxel set; and block the background voxel set on the fused image, to obtain the skull-stripped mask.

For example, the stripping unit 302 may be specifically configured to: set values of voxel points in the encephalic regions to 1, and set values of voxel points in the background regions to 0, to obtain the skull-stripped mask.

(3) Extraction unit 303

The extraction unit 303 is configured to separately perform feature extraction on the plurality of modal images, and fuse extracted features.

An example in which the plurality of modal images include a first modal image, a second modal image, and a third modal image are still used. Then in this case, the extraction unit 303 may be specifically configured to: separately perform feature extraction on the first modal image, the second modal image, and the third modal image, and fuse extracted features. For example, details may be as follows:

fusing the first modal image and the second modal image, to obtain a fused image, separately performing feature extraction on the fused image and the third modal image by using a trained multi-branch fully convolutional network, and fusing extracted features.

If the stripping unit 302 has already fused the first modal image and the second modal image and performed storage, in this case, the extraction unit 303 may alternatively directly read a stored fused image without a need to fuse the first modal image and the second modal image again, that is:

The extraction unit 303 may be specifically configured to: obtain a fused image, separately perform feature extraction on the fused image and the third modal image by using a trained multi-branch fully convolutional network, and fuse extracted features.

A structure of the trained multi-branch fully convolutional network may be set according to requirements for an actual application. For example, the trained multi-branch fully convolutional network may include an upper-branch three-dimensional residual structure, a lower-branch three-dimensional residual structure, and a classification network module, and in this case:

The extraction unit 303 may be specifically configured to: perform feature extraction on the fused image by using the upper-branch three-dimensional residual structure, to obtain an upper-branch feature; perform feature extraction on the third modal image by using the lower-branch three-dimensional residual structure, to obtain a lower-branch feature; and fuse the upper-branch feature and the lower-branch feature by using the classification network module.

The upper-branch three-dimensional residual structure may include an upper-branch convolution module, a first upper-branch residual block, a first upper-branch downsampling module, a second upper-branch residual block, a second upper-branch downsampling module, a third upper-branch residual block, and a third upper-branch downsampling module, and then:

The extraction unit 303 may be specifically configured to: perform convolution on the fused image by using the upper-branch convolution module; encode an output of the upper-branch convolution module by using the first upper-branch residual block, and perform a downsampling operation on a result of the encoding by using the first upper-branch downsampling module; encode an output of the first upper-branch downsampling module by using the second upper-branch residual block, and perform a downsampling operation on a result of the encoding by using the second upper-branch downsampling module; and encode an output of the second upper-branch downsampling module by using the third upper-branch residual block, and perform a downsampling operation on a result of the encoding by using the third upper-branch downsampling module, to obtain the upper-branch feature.

The lower-branch three-dimensional residual structure includes a lower-branch convolution module, a first lower-branch residual block, a first lower-branch downsampling module, a second lower-branch residual block, a second lower-branch downsampling module, a third lower-branch residual block, and a third lower-branch downsampling module, and then:

The extraction unit 303 may be specifically configured to: perform convolution on the third modal image by using the lower-branch convolution module; encode an output of the lower-branch convolution module by using the first lower-branch residual block, and perform a downsampling operation on a result of the encoding by using the first lower-branch downsampling module; encode an output of the first lower-branch downsampling module by using the second lower-branch residual block, and perform a downsampling operation on a result of the encoding by using the second lower-branch downsampling module; and encode an output of the second lower-branch downsampling module by using the third lower-branch residual block, and perform a downsampling operation on a result of the encoding by using the third lower-branch downsampling module, to obtain the lower-branch feature.

Network parameters of the upper-branch convolution module, the first upper-branch residual block, the second upper-branch residual block, the third upper-branch residual block, the lower-branch convolution module, the first lower-branch residual block, the second lower-branch residual block, and the third lower-branch residual block may be set according to requirements for an actual application. For details, reference may be made to the foregoing embodiments, and details are not described herein again.

In addition, there may be a plurality of manners of a downsampling operation in this embodiment of this application. For example, a downsampling operation may be performed by using a maximum pooling layer. Another manner may alternatively be used. For example, convolution may be performed, by separately using two parallel convolutional layers having the same stride and different convolution kernels, on data that needs to be downsampled, and then a batch normalization layer performs batch normalization on a result obtained through the convolution, to achieve an objective of downsampling. For details, refer to the foregoing embodiments, and details are not described herein again.

(4) Segmentation unit 304

The segmentation unit 304 is configured to segment encephalic tissues according to a fused feature, to obtain an initial segmentation result.

For example, the segmentation unit 304 may be specifically configured to: classify the fused feature by using a classification network module, and segment the encephalic tissues based on a classification result, to obtain the initial segmentation result.

(5) Fusion unit 305

The fusion unit 305 is configured to fuse the mask and the initial segmentation result, to obtain a segmentation result corresponding to the to-be-segmented image group.

For example, the fusion unit may be specifically configured to: separately obtain a value of each voxel on the mask and a value of each voxel in the initial segmentation result, establish a first matrix according to the value of each voxel on the mask, and establish a second matrix according to the value of each voxel in the initial segmentation result; and perform a dot product operation on elements in the first matrix and elements in the second matrix, to obtain the segmentation result corresponding to the to-be-segmented image group.

Figure 13:
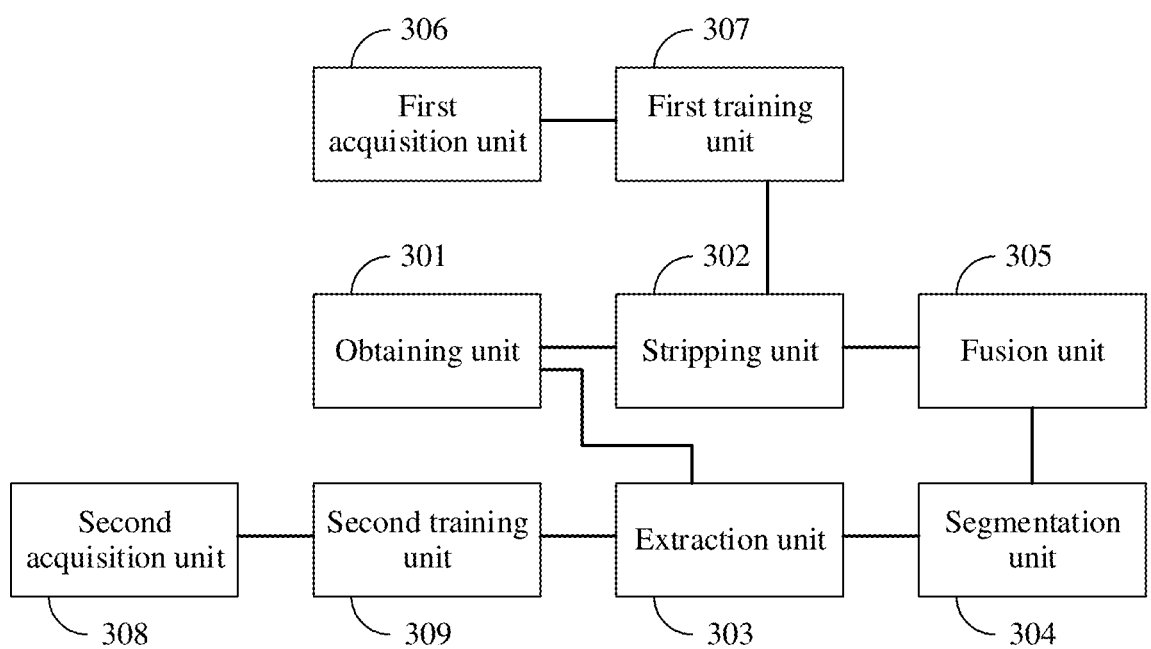
FIG. 13 is another schematic structural diagram of a brain image segmentation apparatus according to an embodiment of this application.

The trained three-dimensional fully convolutional network may be obtained by training a plurality of first sample image groups, which may specifically be that: after being trained by another device, the plurality of first sample image groups are provided to the brain image segmentation apparatus; alternatively, the training may be performed by the brain image segmentation apparatus. That is, as shown in FIG. 13, the brain image segmentation apparatus may further include a first acquisition unit 306 and a first training unit 307, as follows:

The first acquisition unit 306 may be configured to acquire a plurality of first sample image groups, the first sample image group including image samples such as a first modal image sample used for tissue region segmentation and a second modal image sample used for encephalic region identification.

The first training unit 307 may be configured to: fuse the first modal image sample and the second modal image sample, to obtain a fused image sample; predict categories of voxel points in the fused image sample by using a preset three-dimensional fully convolutional network, to obtain predicted values; obtain actual values of the categories of the voxel points in the fused image sample; and converge the three-dimensional fully convolutional network according to the predicted values and the actual values by using a crossentropy loss function, to obtain the trained three-dimensional fully convolutional network.

Similarly, the trained multi-branch fully convolutional network may be obtained by training a plurality of second sample image groups, which may specifically be that: after being trained by another device, the plurality of second sample image groups are provided to the brain image segmentation apparatus; alternatively, the training may be performed by the brain image segmentation apparatus. That is, as shown in FIG. 13, the brain image segmentation apparatus may further include a second acquisition unit 308 and a second training unit 309, as follows:

The second acquisition unit 308 may be configured to acquire a plurality of second sample image groups, the second sample image group including a first modal image sample used for tissue region segmentation, a second modal image sample used for encephalic region identification, and a third modal image sample used for protein lesion region identification.

The second training unit 309 may be configured to: fuse the first modal image sample and the second modal image sample, to obtain a fused image sample; separately perform feature extraction on the fused image sample and the third modal image sample by using a preset multi-branch fully convolutional network; fuse extracted features, and classify a fused feature, to obtain a predicted category value; obtain an actual category value of the fused feature; and converge the multi-branch fully convolutional network according to the predicted category value and the actual category value by using a multi-categorization loss function, to obtain a trained multi-branch fully convolutional network.

During specific implementation, the foregoing units may be implemented as independent entities, or may be randomly combined, or may be implemented as the same entity or several entities. For specific implementation of the foregoing units, refer to the foregoing method embodiments. Details are not described herein again.

It can be known from above that, in this embodiment, after a to-be-segmented image group is obtained, on one hand, the stripping unit 302 may perform skull stripping according to a plurality of modal images in the to-be-segmented image group, to obtain a skull-stripped mask; on the other hand, the extraction unit 303 may separately perform feature extraction on the plurality of modal images and fuse extracted features, then the segmentation unit 304 segments encephalic tissues according to a fused feature, and subsequently the fusion unit 305 fuses an initial segmentation result obtained through segmentation and the previously obtained mask, to obtain a final segmentation result. In this solution, during initial segmentation, a manner of first extracting the features of the modal images and then fusing the extracted features is used. Therefore, information contained in modalities can be retained as much as possible, thereby improving expression capabilities of the extracted features. In addition, the mask obtained through skull stripping may further be used to remove a false positive phenomenon in the segmentation result obtained through the initial segmentation. Therefore, compared with a solution in which the modal images are directly fused and skull stripping is directly performed, and then segmentation is performed based on a result of the stripping, this solution can improve feature expression capabilities and segmentation accuracy.

The embodiments of this application further provide a network device. FIG. 14 is a schematic structural diagram of a network device according to an embodiment of this application.

The network device may include components such as a processor 401 including one or more processing cores, a memory 402 including one or more computer-readable storage media, a power supply 403, and an input unit 404. A person skilled in the art may understand that the structure of the network device shown in FIG. 14 does not constitute a limitation to the network device, and the network device may include more or fewer components than those shown in the figure, or some components may be combined, or a different component deployment may be used. Herein:

The processor 401 is a control center of the network device, and connects various parts of the entire network device by using various interfaces and lines. By running or executing a plurality of instructions (software programs and/or modules) stored in the memory 402, and invoking data stored in the memory 402, the processor 401 performs various functions and data processing of the network device, thereby performing overall monitoring on the network device. The processor 401 may include one or more processing cores. The processor 401 may integrate an application processor and a modem processor. The application processor mainly processes an operating storage medium, a user interface, an application program, and the like. The modem processor mainly processes wireless communication. It may be understood that the modem processor may alternatively not be integrated into the processor 401.

The memory 402 may be configured to store a plurality of instructions, software programs and modules. The processor 401 runs the plurality of instructions, software programs and modules stored in the memory 402, to perform various function applications and data processing. The memory 402 may mainly include a program storage area and a data storage area. The program storage area may store an operating storage medium, an application program required by at least one function (for example, a sound playback function and an image display function), and the like. The data storage area may store data created according to use of the network device, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The network device further includes the power supply 403 for supplying power to the components. The power supply 403 may be logically connected to the processor 401 by using a power management storage medium, thereby implementing functions such as charging, discharging, and power consumption management by using the power management storage medium. The power supply 403 may further include one or more direct current or alternate current power supplies, one or more re-charging storage mediums, one or more power supply fault detection circuits, one or more power supply converters or inverters, one or more power supply state indicators, or any other components.

The network device may further include the input unit 404. The input unit 404 may be configured to receive input digit or character information and generate keyboard, mouse, joystick, optical, or trackball signal input related to user settings and function control.

Although not shown in the figure, the network device may further include a display unit, and the like. Details are not described herein again. Specifically, in this embodiment, the processor 401 in the network device may load executable files corresponding to processes of one or more application programs to the memory 402 according to the following instructions, and the processor 401 runs the application programs stored in the memory 402 to implement the following various functions:

obtaining a to-be-segmented image group, the to-be-segmented image group including a plurality of modal images of a brain; performing skull stripping according to the plurality of modal images, to obtain a skull-stripped mask; separately performing feature extraction on the plurality of modal images, and fusing extracted features; segmenting encephalic tissues according to a fused feature, to obtain an initial segmentation result; and fusing the mask and the initial segmentation result, to obtain a segmentation result corresponding to the to-be-segmented image group.

For example, specifically, a first modal image and a second modal image may be fused, to obtain a fused image; then on one hand, categories of voxel points in the fused image are predicted by using a trained three-dimensional fully convolutional network; voxel points belonging to no encephalic region are screened according to the predicted categories of the voxel points, to obtain a background voxel set; and the background voxel set is blocked on the fused image, to obtain the skull-stripped mask; and on the other hand, feature extraction is performed on the fused image by using an upper-branch three-dimensional residual structure of a trained multi-branch fully convolutional network, to obtain an upper-branch feature, and feature extraction is performed on a third modal image by using a lower-branch three-dimensional residual structure of the trained multi-branch fully convolutional network, to obtain a lower-branch feature; and subsequently, the upper-branch feature and the lower-branch feature are fused by using a classification network module of the trained multi-branch fully convolutional network, a fused feature is classified by using the classification network module, and the encephalic tissues are segmented based on a classification result, to obtain the initial segmentation result.

The trained three-dimensional fully convolutional network may be obtained by training a plurality of first sample image groups. The trained multi-branch fully convolutional network may be obtained by training a plurality of second sample image groups, which may specifically be that: after being trained by another device, the plurality of second sample image groups are provided to the brain image segmentation apparatus; alternatively, the training may be performed by the brain image segmentation apparatus. That is, the processor 401 may further run the application programs stored in the memory 402, to further implement the following functions:

acquiring a plurality of first sample image groups, the first sample image group including image samples such as a first modal image sample used for tissue region segmentation and a second modal image sample used for encephalic region identification; fusing the first modal image sample and the second modal image sample, to obtain a fused image sample; and predicting categories of voxel points in the fused image sample by using a preset three-dimensional fully convolutional network, to obtain predicted values; obtain actual values of the categories of the voxel points in the fused image sample; and converging the three-dimensional fully convolutional network according to the predicted values and the actual values by using a crossentropy loss function, to obtain the trained three-dimensional fully convolutional network; and acquiring a plurality of second sample image groups, the second sample image group including a first modal image sample used for tissue region segmentation, a second modal image sample used for encephalic region identification, and a third modal image sample used for protein lesion region identification; fusing the first modal image sample and the second modal image sample, to obtain a fused image sample; separately performing feature extraction on the fused image sample and the third modal image sample by using a preset multi-branch fully convolutional network; fusing extracted features, and classifying a fused feature, to obtain a predicted category value; obtaining an actual category value of the fused feature; and converging the multi-branch fully convolutional network according to the predicted category value and the actual category value by using a multi-categorization loss function, to obtain a trained multi-branch fully convolutional network.

For specific implementations of the above operations, refer to the foregoing embodiments. Details are not described herein again.

It can be known from above that, in this embodiment, after a to-be-segmented image group is obtained, on one hand, the network device may perform skull stripping according to a plurality of modal images in the to-be-segmented image group, to obtain a skull-stripped mask; on the other hand, the network device may separately perform feature extraction on the plurality of modal images and fuse extracted features, then segment encephalic tissues according to a fused feature, and subsequently fuse an initial segmentation result obtained through segmentation and the previously obtained mask, to obtain a final segmentation result. In this solution, during initial segmentation, a manner of first extracting the features of the modal images and then fusing the extracted features is used. Therefore, information contained in modalities can be retained as much as possible, thereby improving expression capabilities of the extracted features. In addition, the mask obtained through skull stripping may further be used to remove a false positive phenomenon in the segmentation result obtained through the initial segmentation. Therefore, compared with a solution in which the modal images are directly fused and skull stripping is directly performed, and then segmentation is performed based on a result of the stripping, this solution can improve feature expression capabilities and segmentation accuracy.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, an embodiment of this application provides a storage medium, storing a plurality of instructions. The instructions can be loaded by a processor, to perform the steps in any brain image segmentation method according to the embodiments of this application. For example, the instructions may perform the following steps:

obtaining a to-be-segmented image group, the to-be-segmented image group including a plurality of modal images of a brain; performing skull stripping according to the plurality of modal images, to obtain a skull-stripped mask; separately performing feature extraction on the plurality of modal images, and fusing extracted features; segmenting encephalic tissues according to a fused feature, to obtain an initial segmentation result; and fusing the mask and the initial segmentation result, to obtain a segmentation result corresponding to the to-be-segmented image group.

For example, specifically, a first modal image and a second modal image may be fused, to obtain a fused image; then on one hand, categories of voxel points in the fused image are predicted by using a trained three-dimensional fully convolutional network; voxel points belonging to no encephalic region are screened according to the predicted categories of the voxel points, to obtain a background voxel set; and the background voxel set is blocked on the fused image, to obtain the skull-stripped mask; and on the other hand, feature extraction is performed on the fused image by using an upper-branch three-dimensional residual structure of a trained multi-branch fully convolutional network, to obtain an upper-branch feature, and feature extraction is performed on a third modal image by using a lower-branch three-dimensional residual structure of the trained multi-branch fully convolutional network, to obtain a lower-branch feature; and subsequently, the upper-branch feature and the lower-branch feature are fused by using a classification network module of the trained multi-branch fully convolutional network, a fused feature is classified by using the classification network module, and the encephalic tissues are segmented based on a classification result, to obtain the initial segmentation result.

The trained three-dimensional fully convolutional network may be obtained by training a plurality of first sample image groups. The trained multi-branch fully convolutional network may be obtained by training a plurality of second sample image groups, which may specifically be that: after being trained by another device, the plurality of second sample image groups are provided to the brain image segmentation apparatus; alternatively, the training may be performed by the brain image segmentation apparatus. That is, the instructions may further perform the following steps:

acquiring a plurality of first sample image groups, the first sample image group including image samples such as a first modal image sample used for tissue region segmentation and a second modal image sample used for encephalic region identification; fusing the first modal image sample and the second modal image sample, to obtain a fused image sample; and predicting categories of voxel points in the fused image sample by using a preset three-dimensional fully convolutional network, to obtain predicted values; obtain actual values of the categories of the voxel points in the fused image sample; and converging the three-dimensional fully convolutional network according to the predicted values and the actual values by using a crossentropy loss function, to obtain the trained three-dimensional fully convolutional network.

acquiring a plurality of second sample image groups, the second sample image group including a first modal image sample used for tissue region segmentation, a second modal image sample used for encephalic region identification, and a third modal image sample used for protein lesion region identification; fusing the first modal image sample and the second modal image sample, to obtain a fused image sample; separately performing feature extraction on the fused image sample and the third modal image sample by using a preset multi-branch fully convolutional network; fusing extracted features, and classifying a fused feature, to obtain a predicted category value; obtaining an actual category value of the fused feature; and converging the multi-branch fully convolutional network according to the predicted category value and the actual category value by using a multi-categorization loss function, to obtain a trained multi-branch fully convolutional network.

For specific implementations of the above operations, refer to the foregoing embodiments. Details are not described herein again.

The storage medium may include a read-only memory (ROM), a random access memory (RAM), a magnetic disk, an optical disc, or the like.

Because the instructions stored in the storage medium may perform the steps of any brain image segmentation method provided in the embodiments of this application, the instructions can implement beneficial effects that can be implemented by any brain image segmentation method provided in the embodiments of this application. For details, reference may be made to the foregoing embodiments. Details are not described herein again.

The brain image segmentation method and apparatus and the storage medium provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person skilled in the art may make modifications to the specific implementations and application range according to the idea of this application. In conclusion, the content of this specification is not to be construed as a limitation to this application.

What is claimed is:

1. A method for segmenting medical images, comprising:
    obtaining, by a device comprising a memory storing instructions and a processor in communication with the memory, a to-be-segmented image group comprising a plurality of modal images of a brain, the plurality of modal images comprising a first modal image used for tissue region segmentation, a second modal image used for encephalic region identification, and a third modal image used for protein lesion region identification;
    performing, by the device, skull stripping according to the plurality of modal images to obtain a skull-stripped mask;
    separately performing, by the device, feature extraction on the plurality of modal images to obtain extracted features, and fusing the extracted features to obtain a fused feature, by:
        fusing the first modal image and the second modal image to obtain a fused image, and
        separately performing feature extraction on the fused image and the third modal image by using a trained multi-branch fully convolutional network, and fusing the extracted features;
    segmenting, by the device, encephalic tissues according to the fused feature to obtain an initial segmentation result; and
    fusing, by the device, the skull-stripped mask and the initial segmentation result to obtain a segmentation result corresponding to the to-be-segmented image group.

2. The method according to claim 1, wherein:
    the performing skull stripping according to the plurality of modal images to obtain the skull-stripped mask comprises:
        performing skull stripping according to the first modal image and the second modal image to obtain the skull-stripped mask.

3. The method according to claim 2, wherein the performing skull stripping according to the first modal image and the second modal image to obtain the skull-stripped mask comprises:
    fusing the first modal image and the second modal image to obtain a fused image;
    predicting categories of voxel points in the fused image by using a trained three-dimensional fully convolutional network;
    screening, according to the predicted categories of the voxel points, voxel points belonging to no encephalic region, to obtain a background voxel set; and
    blocking the background voxel set on the fused image, to obtain the skull-stripped mask.

4. The method according to claim 1, wherein:
    the trained multi-branch fully convolutional network comprises an upper-branch three-dimensional residual structure, a lower-branch three-dimensional residual structure, and a classification network module; and
    the separately performing feature extraction on the fused image and the third modal image by using the trained multi-branch fully convolutional network, and fusing the extracted features comprises:
        performing feature extraction on the fused image by using the upper-branch three-dimensional residual structure, to obtain an upper-branch feature,
        performing feature extraction on the third modal image by using the lower-branch three-dimensional residual structure, to obtain a lower-branch feature, and
        fusing the upper-branch feature and the lower-branch feature by using the classification network module.

5. The method according to claim 4, wherein:
    the upper-branch three-dimensional residual structure comprises an upper-branch convolution module, a first upper-branch residual block, a first upper-branch downsampling module, a second upper-branch residual block, a second upper-branch downsampling module, a third upper-branch residual block, and a third upper-branch downsampling module; and
    the performing feature extraction on the fused image by using the upper-branch three-dimensional residual structure, to obtain the upper-branch feature comprises:

performing convolution on the fused image by using the upper-branch convolution module, encoding an output of the upper-branch convolution module by using the first upper-branch residual block, and performing a downsampling operation on a result of the encoding by using the first upper-branch downsampling module, encoding an output of the first upper-branch downsampling module by using the second upper-branch residual block, and performing a downsampling operation on a result of the encoding by using the second upper-branch downsampling module, and encoding an output of the second upper-branch downsampling module by using the third upper-branch residual block, and performing a downsampling operation on a result of the encoding by using the third upper-branch downsampling module, to obtain the upper-branch feature.

6. The method according to claim 4, wherein:

the lower-branch three-dimensional residual structure comprises a lower-branch convolution module, a first lower-branch residual block, a first lower-branch downsampling module, a second lower-branch residual block, a second lower-branch downsampling module, a third lower-branch residual block, and a third lower-branch downsampling module; and the performing feature extraction on the third modal image by using the lower-branch three-dimensional residual structure, to obtain the lower-branch feature comprises:

performing convolution on the third modal image by using the lower-branch convolution module, encoding an output of the lower-branch convolution module by using the first lower-branch residual block, and performing a downsampling operation on a result of the encoding by using the first lower-branch downsampling module, encoding an output of the first lower-branch downsampling module by using the second lower-branch residual block, and performing a downsampling operation on a result of the encoding by using the second lower-branch downsampling module, and encoding an output of the second lower-branch downsampling module by using the third lower-branch residual block, and performing a downsampling operation on a result of the encoding by using the third lower-branch downsampling module, to obtain the lower-branch feature.

7. An apparatus for segmenting medical images, the apparatus comprising:

a memory storing instructions; and a processor in communication with the memory, wherein, when the processor executes the instructions, the processor is configured to cause the apparatus to perform:

obtaining a to-be-segmented image group comprising a plurality of modal images of a brain, the plurality of modal images comprising a first modal image used for tissue region segmentation, a second modal image used for encephalic region identification, and a third modal image used for protein lesion region identification, performing skull stripping according to the plurality of modal images to obtain a skull-stripped mask, separately performing feature extraction on the plurality of modal images to obtain extracted features, and fusing the extracted features to obtain a fused feature by:

fusing the first modal image and the second modal image to obtain a fused image, and separately performing feature extraction on the fused image and the third modal image by using a trained multi-branch fully convolutional network, and fusing the extracted features, segmenting encephalic tissues according to the fused feature to obtain an initial segmentation result, and fusing the skull-stripped mask and the initial segmentation result to obtain a segmentation result corresponding to the to-be-segmented image group.

8. The apparatus according to claim 7, wherein:

when the processor is configured to cause the apparatus to perform performing skull stripping according to the plurality of modal images to obtain the skull-stripped mask, the processor is configured to cause the apparatus to perform:

performing skull stripping according to the first modal image and the second modal image to obtain the skull-stripped mask.

9. The apparatus according to claim 8, wherein, when the processor is configured to cause the apparatus to perform performing skull stripping according to the first modal image and the second modal image to obtain the skull-stripped mask, the processor is configured to cause the apparatus to perform:

fusing the first modal image and the second modal image to obtain a fused image;

predicting categories of voxel points in the fused image by using a trained three-dimensional fully convolutional network;

screening, according to the predicted categories of the voxel points, voxel points belonging to no encephalic region, to obtain a background voxel set; and blocking the background voxel set on the fused image, to obtain the skull-stripped mask.

10. The apparatus according to claim 7, wherein:

the trained multi-branch fully convolutional network comprises an upper-branch three-dimensional residual structure, a lower-branch three-dimensional residual structure, and a classification network module; and when the processor is configured to cause the apparatus to perform separately performing feature extraction on the fused image and the third modal image by using the trained multi-branch fully convolutional network, and fusing the extracted features, the processor is configured to cause the apparatus to perform:

performing feature extraction on the fused image by using the upper-branch three-dimensional residual structure, to obtain an upper-branch feature, performing feature extraction on the third modal image by using the lower-branch three-dimensional residual structure, to obtain a lower-branch feature, and fusing the upper-branch feature and the lower-branch feature by using the classification network module.

11. The apparatus according to claim 10, wherein:

the upper-branch three-dimensional residual structure comprises an upper-branch convolution module, a first upper-branch residual block, a first upper-branch downsampling module, a second upper-branch residual block, a second upper-branch downsampling module, a third upper-branch residual block, and a third upper-branch downsampling module; and when the processor is configured to cause the apparatus to perform performing feature extraction on the fused image by using the upper-branch three-dimensional residual structure, to obtain the upper-branch feature, the processor is configured to cause the apparatus to perform:
  performing convolution on the fused image by using the upper-branch convolution module,
  encoding an output of the upper-branch convolution module by using the first upper-branch residual block, and performing a downsampling operation on a result of the encoding by using the first upper-branch downsampling module,
  encoding an output of the first upper-branch downsampling module by using the second upper-branch residual block, and performing a downsampling operation on a result of the encoding by using the second upper-branch downsampling module, and
  encoding an output of the second upper-branch downsampling module by using the third upper-branch residual block, and performing a downsampling operation on a result of the encoding by using the third upper-branch downsampling module, to obtain the upper-branch feature.

12. The apparatus according to claim 10, wherein:
the lower-branch three-dimensional residual structure comprises a lower-branch convolution module, a first lower-branch residual block, a first lower-branch downsampling module, a second lower-branch residual block, a second lower-branch downsampling module, a third lower-branch residual block, and a third lower-branch downsampling module; and
when the processor is configured to cause the apparatus to perform performing feature extraction on the third modal image by using the lower-branch three-dimensional residual structure, to obtain the lower-branch feature, the processor is configured to cause the apparatus to perform:
  performing convolution on the third modal image by using the lower-branch convolution module,
  encoding an output of the lower-branch convolution module by using the first lower-branch residual block, and performing a downsampling operation on a result of the encoding by using the first lower-branch downsampling module,
  encoding an output of the first lower-branch downsampling module by using the second lower-branch residual block, and performing a downsampling operation on a result of the encoding by using the second lower-branch downsampling module, and
  encoding an output of the second lower-branch downsampling module by using the third lower-branch residual block, and performing a downsampling operation on a result of the encoding by using the third lower-branch downsampling module, to obtain the lower-branch feature.

13. A non-transitory computer readable storage medium, storing computer readable instructions, wherein, the computer readable instructions, when executed by a processor in a first electronic device, are configured to cause the processor to perform:
  obtaining a to-be-segmented image group comprising a plurality of modal images of a brain, the plurality of modal images comprising a first modal image used for tissue region segmentation, a second modal image used for encephalic region identification, and a third modal image used for protein lesion region identification;
  performing skull stripping according to the plurality of modal images to obtain a skull-stripped mask;
  separately performing feature extraction on the plurality of modal images to obtain extracted features, and fusing the extracted features to obtain a fused feature, by:
    fusing the first modal image and the second modal image to obtain a fused image, and
    separately performing feature extraction on the fused image and the third modal image by using a trained multi-branch fully convolutional network, and fusing the extracted features;
  segmenting encephalic tissues according to the fused feature to obtain an initial segmentation result; and
  fusing the skull-stripped mask and the initial segmentation result to obtain a segmentation result corresponding to the to-be-segmented image group.

14. The non-transitory computer readable storage medium according to claim 13, wherein,
when the computer readable instructions are configured to cause the processor to perform performing skull stripping according to the plurality of modal images to obtain the skull-stripped mask, the computer readable instructions are configured to cause the processor to perform:
  performing skull stripping according to the first modal image and the second modal image to obtain the skull-stripped mask.

15. The non-transitory computer readable storage medium according to claim 14, wherein, when the computer readable instructions are configured to cause the processor to perform performing skull stripping according to the first modal image and the second modal image to obtain the skull-stripped mask, the computer readable instructions are configured to cause the processor to perform:
  fusing the first modal image and the second modal image to obtain a fused image;
  predicting categories of voxel points in the fused image by using a trained three-dimensional fully convolutional network;
  screening, according to the predicted categories of the voxel points, voxel points belonging to no encephalic region, to obtain a background voxel set; and
  blocking the background voxel set on the fused image, to obtain the skull-stripped mask.

16. The non-transitory computer readable storage medium according to claim 13, wherein
the trained multi-branch fully convolutional network comprises an upper-branch three-dimensional residual structure, a lower-branch three-dimensional residual structure, and a classification network module; and
when the computer readable instructions are configured to cause the processor to perform separately performing feature extraction on the fused image and the third modal image by using the trained multi-branch fully convolutional network, and fusing the extracted features, the computer readable instructions are configured to cause the processor to perform:
  performing feature extraction on the fused image by using the upper-branch three-dimensional residual structure, to obtain an upper-branch feature,
  performing feature extraction on the third modal image by using the lower-branch three-dimensional residual structure, to obtain a lower-branch feature, and
  fusing the upper-branch feature and the lower-branch feature by using the classification network module.

17. The non-transitory computer readable storage medium according to claim 16, wherein:
- the upper-branch three-dimensional residual structure comprises an upper-branch convolution module, a first upper-branch residual block, a first upper-branch downsampling module, a second upper-branch residual block, a second upper-branch downsampling module, a third upper-branch residual block, and a third upper-branch downsampling module;
- when the computer readable instructions are configured to cause the processor to perform performing feature extraction on the fused image by using the upper-branch three-dimensional residual structure, to obtain the upper-branch feature, the computer readable instructions are configured to cause the processor to perform:
  - performing convolution on the fused image by using the upper-branch convolution module,
  - encoding an output of the upper-branch convolution module by using the first upper-branch residual block, and performing a downsampling operation on a result of the encoding by using the first upper-branch downsampling module,
  - encoding an output of the first upper-branch downsampling module by using the second upper-branch residual block, and performing a downsampling operation on a result of the encoding by using the second upper-branch downsampling module, and
  - encoding an output of the second upper-branch downsampling module by using the third upper-branch residual block, and performing a downsampling operation on a result of the encoding by using the third upper-branch downsampling module, to obtain the upper-branch feature;
- the lower-branch three-dimensional residual structure comprises a lower-branch convolution module, a first lower-branch residual block, a first lower-branch downsampling module, a second lower-branch residual block, a second lower-branch downsampling module, a third lower-branch residual block, and a third lower-branch downsampling module; and
- when the computer readable instructions are configured to cause the processor to perform performing feature extraction on the third modal image by using the lower-branch three-dimensional residual structure, to obtain the lower-branch feature, the computer readable instructions are configured to cause the processor to perform:
  - performing convolution on the third modal image by using the lower-branch convolution module,
  - encoding an output of the lower-branch convolution module by using the first lower-branch residual block, and performing a downsampling operation on a result of the encoding by using the first lower-branch downsampling module,
  - encoding an output of the first lower-branch downsampling module by using the second lower-branch residual block, and performing a downsampling operation on a result of the encoding by using the second lower-branch downsampling module, and
  - encoding an output of the second lower-branch downsampling module by using the third lower-branch residual block, and performing a downsampling operation on a result of the encoding by using the third lower-branch downsampling module, to obtain the lower-branch feature.

* * * * *